US012783230B2

(12) United States Patent
Monasterio

(10) Patent No.: US 12,783,230 B2
(45) Date of Patent: Nov. 3, 2026

(54) AUTOMATED SYSTEM TO CREATE "CHANGE HISTORY" AND/OR "COMMIT-MESSAGE" IN RESPONSE TO USER EDITS

(71) Applicant: Rockwell Automation Technologies, Inc., Mayfield Heights, OH (US)

(72) Inventor: Jorge Monasterio, San Diego, CA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 266 days.

(21) Appl. No.: 18/590,592

(22) Filed: Feb. 28, 2024

(65) Prior Publication Data

US 2025/0272090 A1 Aug. 28, 2025

(51) Int. Cl.
*G06F 8/73* (2018.01)
*G06F 8/71* (2018.01)
(Continued)

(52) U.S. Cl.
CPC .................. *G06F 8/71* (2013.01); *G06F 8/20* (2013.01); *G06F 8/35* (2013.01); *G06F 8/37* (2013.01);
(Continued)

(58) Field of Classification Search
CPC .............. G06F 8/71; G06F 8/427; G06F 8/37; G06F 8/73; G06F 8/20; G06F 8/433; G06F 8/65;
(Continued)

(56) References Cited

U.S. PATENT DOCUMENTS 6,173,441 B1 1/2001 Klein
10,474,437 B2 * 11/2019 Liu .......................... G06F 8/63
(Continued)

OTHER PUBLICATIONS

Robledo et al., An open-source natural language processing toolkit to support software development: addressing automatic bug, 2023, [Retrieved on Mar. 2, 2026]. Retrieved from the internet: <URL: https://pmc.ncbi.nlm.nih.gov/articles/PMC11036033/pdf/openreseurope-2-18099.pdf> 34 Pages (1-34) (Year: 2023).*
(Continued)

*Primary Examiner* — Anibal Riveracruz
(74) *Attorney, Agent, or Firm* — Amin, Turocy & Watson, LLP

(57) ABSTRACT

Generative artificial intelligence/machine language (AI/ML) is used to resolve a merge conflict between two or more versions of a program code. The program code can be industrial automation software utilized to control one or more programmable logic controllers (PLCs) in an industrial environment. Interaction with the program code can be via a programming tool that presents the program code in a human readable format, while the AI/ML can be applied to the underlying source code. Hence, while the source code is applied to the PLC, the programming tool enables interaction various human readable summaries of the program code and respective options available to resolve the merge conflict. Accordingly, a process engineer, or suchlike, does not have to be familiar with the source code format to readily understand a summary of the merge conflict or one or more options available to correct the conflict.

20 Claims, 14 Drawing Sheets

(51) Int. Cl.

| | |
|---|---|
| ***G06F 8/77*** | (2018.01) |
| *G06F 8/20* | (2018.01) |
| *G06F 8/30* | (2018.01) |
| *G06F 8/35* | (2018.01) |
| *G06F 8/41* | (2018.01) |
| *G06F 8/51* | (2018.01) |
| *G06F 8/60* | (2018.01) |
| *G06F 8/61* | (2018.01) |
| *G06F 8/65* | (2018.01) |

(52) U.S. Cl.
CPC .............. *G06F 8/427* (2013.01); *G06F 8/433* (2013.01); *G06F 8/51* (2013.01); *G06F 8/60* (2013.01); *G06F 8/63* (2013.01); *G06F 8/65* (2013.01); *G06F 8/73* (2013.01)

(58) Field of Classification Search
CPC ..... G06F 8/51; G06F 8/35; G06F 8/60; G06F 8/63
See application file for complete search history.

(56) References Cited

U.S. PATENT DOCUMENTS

| | | | | |
|---|---|---|---|---|
| 11,340,895 | B2 | 5/2022 | Tommasi et al. | |
| 11,714,617 | B1 | 8/2023 | Sundaresan et al. | |
| 12,159,211 | B2 | 12/2024 | Bird et al. | |
| 12,307,247 | B1 | 5/2025 | Dziubinski et al. | |
| 12,487,819 | B2 | 12/2025 | Sundaresan et al. | |
| 2020/0097261 | A1 | 3/2020 | Smith et al. | |
| 2020/0341755 | A1 | 10/2020 | Woulfe | |
| 2021/0141640 | A1 | 5/2021 | Turner et al. | |
| 2021/0397416 | A1* | 12/2021 | Rajesh | G06F 8/31 |
| 2023/0281005 | A1 | 9/2023 | Groenewegen et al. | |
| 2024/0184556 | A1* | 6/2024 | Singh | G06F 8/51 |
| 2024/0403000 | A1 | 12/2024 | Duggal et al. | |
| 2025/0045028 | A1* | 2/2025 | Sikand | G06F 8/35 |
| 2025/0068417 | A1 | 2/2025 | Van Der Sman et al. | |
| 2025/0138818 | A1* | 5/2025 | Edwards | G06F 8/75 |

OTHER PUBLICATIONS

Non-Final Office Action received for U.S. Appl. No. 18/590,578 dated Dec. 16, 2025, 16 pages.
Svyatkovskiy et al., “Program Merge Conflict Resolution via Neural Transformers”, Association for Computing Machinery, Nov. 14-18, 2022, pp. 822-833.
Extended European Search Report received for European Patent Application Serial No. 25159351.3 dated Jul. 23, 2025, 10 pages.
Zhang et al., “Using Pre-trained Language Models to Resolve Textual and Semantic Merge Conflicts (Experience Paper)”, Association for Computing Machinery, ISSTA ’22, Jul. 18-22, 2022, pp. 77-88.
Shen et al., “Git Merge Conflict Resolution Leveraging Strategy Classification and LLM”, 2023 IEEE 23rd International Conference on Software Quality, Reliability, and Security (QRS), 2023, pp. 228-239.
github.com; About Co-Pilot Pull Request Summaries; Last accessed Feb. 28, 2024 from https://docs.github.com/en/enterprise-cloud@latest/copilot/github-copilot-enterprise/copilot-pull-request-summaries/about-copilot-pull-request-summaries.
github.com; Write Your Git Commits with GitHub Copilot; Last accessed Feb. 28, 2024 from https://devblogs.microsoft.com/visualstudio/write-your-git-commits-with-github-copilot/.
Yanir Manor; Medium.com: How to Generate Commit Messages with AI in Visual Studio Code; Last accessed Feb. 28, 2024 from https://medium.com/@yanirmanor/how-to-generate-commit-messages-with-ai-in-visual-studio-code-4b7367bbafe3.
Final Office Action received for U.S. Appl. No. 18/590,578 dated Apr. 16, 2026, 7 pages.
Notice of Allowance received for U.S. Appl. No. 18/590,578 dated Jun. 22, 2026 08 pages.
Communication pursuant to Article 94(3) EPC received for EP Patent Application Serial No. 25159351.3 dated Jul. 2, 2026, 8 pages.

* cited by examiner

AUTOMATED SYSTEM TO CREATE "CHANGE HISTORY" AND/OR "COMMIT-MESSAGE" IN RESPONSE TO USER EDITS

TECHNICAL FIELD

This application relates to automated systems and process for automatically summarizing content and resolving merge conflicts in a version control system utilized with program code for an industrial automation process.

BACKGROUND

During implementation of an industrial control program for controlling an industrial process, the program can undergo multiple instances of editing and amendment, generating a corresponding number of versions of the program. Each version/instance of a program can be accompanied by a version summary (aka a commit message), whereby the version summary can be created by the entity (e.g., a process engineer) editing the program. Over the course of the lifetime/implementation of the program, the summaries respectively compiled for the respective versions of the program can be created by one or more entities involved with the program/process. However, a summary may not accurately reflect the change, a summary may be understandable to a first entity creating the summary but appear vague/confusing to a second entity, and suchlike.

Further, rather than interacting directly with the program code, the entity may interact with the program code via a graphical user interface (e.g., a programming tool) that provides a representation of the program code in an abstracted format, e.g., as a visual representation in the form of a ladder logic diagram, or via textboxes/prompts listing respective parameters, and suchlike. Accordingly, the entity may be unable to discern a change made to the program code when presented with the program code, rather than as a visual representation of the program code or parameters on an interface. Furthermore, the program code may be in the form of a domain specific language (DSL) that the entity is unfamiliar with, and hence, further unable to discern the change(s) of concern in the program code.

Merge conflicts can also occur when two or more entities are working on the same program code, with their respective code changes being entered concurrently, or nearly so. The respective changes can be directed towards a common device, controller, and suchlike, such that the respective changes conflict and cannot be implemented without further resolution.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to facilitate generation of one or more summaries functioning as a change history or commit message in a version control system.

According to one or more embodiments, a system is provided to generate one or more summaries having plain language content rather than a formal content of an underlying program code, wherein the program code is automation code configured to control operation of the industrial process. The system can comprise a memory that stores computer executable components and a processor that executes the computer executable components stored in the memory.

The computer executable components can comprise a summary component configured to receive a first version of program code, wherein the first version of program code is configured to control operation of a device in an industrial automation process, and further determine an edit being made to the first version of program code, wherein the edit creates a second version of program code from the first version of program code. In another embodiment, the summary component can be further configured to generate a summary of a difference between the first version of program code and the second version of program code resulting from the edit, and further present the summary for review by an entity, wherein the summary is in a plain language format, and content of the summary conveys an effect of applying the edit to the first version of program code. In an embodiment, the first version of program code and the second version of program code have a formal language format. In another embodiment, the second version of program code can be created from the first version of program code, and are sequentially adjacent in a version control history of the program codes. Further, the summary component be configured to generate the summary in accordance with domain specific language being utilized for the industrial automation process.

In another embodiment, the summary component can be further configured to receive an input regarding the content of the summary, parse the input to determine whether the summary is correct, and in response to the input confirming correctness of the summary, saving the summary as a commit message in conjunction with a version of the program code.

In an embodiment, the computer executable components can further comprise a format component configured to convert the program code from the formal language format to the plain language format. In another embodiment, the computer executable components can further comprise a presentation component configured to present the program code in the plain language and the summary in the plain language format.

In an embodiment, the computer executable components can further comprise a prompt component configured to receive a prompt, wherein the prompt provides context regarding how the summary is to be generated, parse the prompt to determine the required context; and wherein the summary component can be further configured to generate the summary in accordance with the context provided in the prompt.

In an embodiment, the computer executable components can further comprise an editor component configured to capture an edit made to the summary, update the summary with the edit, and further save the edited summary with the second version of program code.

In another embodiment, the computer executable components can further comprise an entity component configured to generate entity context regarding at least one of a role of an entity generating the second version of program code or a preferred language of the entity, wherein the summary component can be further configured to generate the summary in accordance with the entity context.

In other embodiments, elements described in connection with the disclosed systems can be embodied in different forms such as computer-implemented methods, computer program products, or other forms. For example, in an embodiment, a computer-implemented method can comprise (a) receiving, by the device, a first version of program code, wherein the first version of program code is configured to control operation of a device in an industrial automation process, (b) determining, by the device, an edit being made to the first version of program code, wherein the edit creates a second version of program code from the first version of program code, (c) generating, by the device, a summary of a difference between the first version of program code and the second version of program code resulting from the edit, and (d) presenting, by the device, the summary for review by an entity, wherein the summary is in a plain language format, and content of the summary conveys an effect of applying the edit to the first version of program code. In an embodiment, the first version of program code and the second version of program code have a formal language format.

In another embodiment, a computer program product can comprise a computer readable storage medium having program instructions embodied therewith, the program instructions can be executable by a processor, causing the processor to perform operations comprising: (a) receiving a first version of program code, wherein the first version of program code is configured to control operation of a device in an industrial automation process; (b) determining an edit being made to the first version of program code, wherein the edit creates a second version of program code from the first version of program code; (c) generating a summary of a difference between the first version of program code and the second version of program code resulting from the edit; and (e) presenting the summary for review by an entity, wherein the summary is in a plain language format, and content of the summary conveys an effect of applying the edit to the first version of program code.

An advantage of the one or more systems, computer-implemented methods and/or computer program products can be presenting summaries of program codes in a version control system, whereby the summaries are in a plain language format enabling expedited review and understanding of the underlying program codes that are conventionally presented in a formal language format.

DESCRIPTION OF THE DRAWINGS

One or more embodiments are described below in the Detailed Description section with reference to the following drawings.

DETAILED DESCRIPTION

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n utilized herein to indicate a respective plurality of devices, components, statements, attributes, etc., where n is are any positive integer. The terms characterize, categorize, identify, determine, infer, and suchlike, are used interchangeably herein.

Computer-based systems typically operate/function based on a sequence of commands, statements, variables, etc., as expressed in a computer program configured to control operation of the computer-based system such as an automated industrial process.

Figure 13:
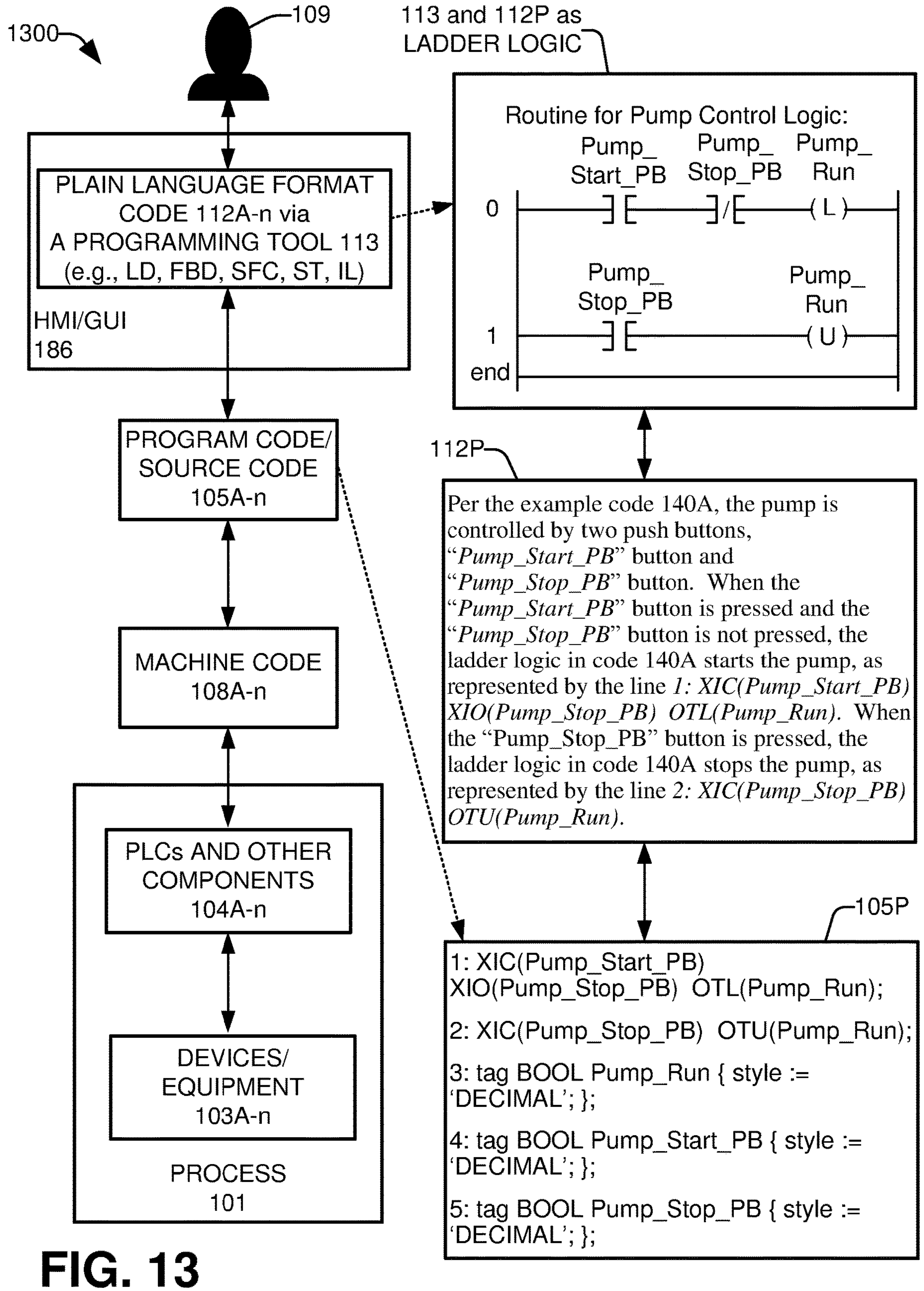
FIG. 13 presents a schematic 1300 illustrating how a computer program can be represented at three levels.

As shown in FIG. 13, schematic 1300, a computer program may effectively comprise/be presented at three levels:

(a) machine instructions/code 108A-n, which are executed at the machine level (e.g., purely numerical language, binary code, and suchlike);

(b) program code 105A-n (aka source code) representing the computer program in a human readable format comprising computer script language (e.g., PYTHON, JAVA, C#, FORTRAN, and suchlike), e.g., with line-by-line code statements, for-while-next loops, function calls, and suchlike; and (c) a plain language format code (PLFC) 112A-n via a programming tool 113. PLFC 112A-n can be generated in a plain language format comprising standard vernacular, syntax, grammar, punctuation, sentences, phrases, and suchlike, to enable quick and easy comprehension of the underlying program code 105A-n and machine code 108A-n. PLFC 112A-n can be constructed in accordance with an entity (e.g., entity 109A-n) interacting with the program code 105A-n and their daily-used language, e.g., PLFC 112A-n presents statements constructed using any syntax of English, Spanish, Mandarin, Hindi, and suchlike.

To distinguish the program code 105A-n from PLFC 112A-n, program code 105A is a formal language based on formal grammar, while PLFC 112A-n is a natural language of a community on which natural language programming (NLP) is based.

Hence, per the example coding presented in FIG. 13, program code 105P comprises the computer code statements:

1: XIC(Pump_Start_PB) XIO(Pump_Stop_PB) OTL (Pump_Run);
2: XIC(Pump_Stop_PB) OTU(Pump_Run);
3: tag BOOL Pump_Run{style:='DECIMAL';};
4: tag BOOL Pump_Start_PB{style:='DECIMAL';};
5: tag BOOL Pump_Stop_PB{style:='DECIMAL';};

while the program code 105P can be presented as PLFC 112P as:

Per the example code 105P, the pump is controlled by two push buttons, "Pump_Start_PB" button and "Pump_Stop_PB" button. When the "Pump_Start_PB" button is pressed and the "Pump_Stop_PB" button is not pressed, the ladder logic in code 105P starts the pump, as represented by the line 1: XIC(Pump_Start_PB) XIO(Pump_Stop_PB) OTL(Pump_Run). When the "Pump_Stop_PB" button is pressed, the ladder logic in code 105A stops the pump, as represented by the line 2: XIC(Pump_Stop_PB) OTU(Pump_Run).

It is readily apparent that an entity 109 can gain quicker understanding of PLFC 112P regarding the computer program than that conferred by program code 105P, and further, it is likely that more entities 109A-n can understand PLFC 112P than program code 105P, even though the underlying content of both program code 105P and PLFC 112P is the same.

Further, the program code 105A-n can be generated as a domain specific language (DSL) such that the program code 105A-n is written in accordance with a format developed by a specific manufacturer/software developer, e.g., to communicate with one or more components 104A-n in their control system, e.g., proprietary PLCs. The PLCs 104A-n can be programmed to control operation of one or more devices/equipment 103A-n in an automated process 101. As mentioned, for convenience/understanding to an entity 109 (e.g., a process engineer, machine operator, and suchlike), the program code 105A-n can be presented in a user-focused PLFC 112A-n to entity 109 via the programming tool 113 on a user interface 186 to enable user interaction with the program code 105A-n.

In the example shown in FIG. 13, program code 105P pertains to operation of PLCs 104A-n (not shown) to control operation of a pump 103P in process 101. Operation of the pump 103P is represented at the programming tool 113 as a ladder logic diagram 112P on the graphical user interface 186. A first entity 109A may be able to comprehend the program code 105P at the program code level, and can program the program code 105P directly, such that entity 109A is familiar with the DSL of program code 105P. However, furthering the example, a second entity 109B may be unable to readily understand the program code 105P expressed at the program code level, and accordingly, interacts with the program code 105P via PLFC 112A-n via the programming tool 113. Accordingly, in the event of changes are made to program code 105P, entity 109A may be able to identify them, however, it is possible that, without extensive time, entity 109B could not read the coded version of program code 105P unless presented as PLFC 112A-n.

Entity 109B can interact with the program code 105P, as PLFC 112A-n, via programming tool 113 on user interface 186 to initially generate the program 105P, and further, edit/amend/change the program 105P over the course of the lifetime of the program while it is being implemented to control a respective process 101. However, the programming tool 113 may not enable entity 109B to review any changes to the program code 105P, as the changes are at the program code level 105P, wherein the program code 105P is effectively behind the user interface 186/programming tool 113.

As mentioned, programs developed for specific industries may be developed in accordance with an industry/proprietary specification. For example, engineering machines may be controlled by programs developed in accordance with the International Electrotechnical Commission (IEC), whereby IEC 61131 provides an international standard for programmable controller programming languages. A DSL program code 105A-n can be created to be in compliance with IEC 61131, but still have a structure, or portions of a structure, that is unique to the DSL. Approaches for rendering program code 105A-n in an automated environment with PLFC 112A-n, via a programming tool 113, can include any of a ladder diagram (LD), a function block diagram (FBD), a sequential function chart (SFC), structured text (ST), an instruction list (IL), and suchlike. Generally, LD, FBD, and SFC are graphical programming language standards/programming tool for controlling operation of a programmable logic control (PLC), for example, while ST and IL are textual programming language standards.

Typically, as the entity 109 makes a change to the program 105A-n and generates a new version of the program 105A-n, the entity 109 can create/write a summary of the changes, with the summary saved with that respective version of the program 105A-n. Generally, when a change summary is applied to a program code 105A-n, the saved summary can be referred to as a "commit message" having the PLFC 112A-n format. However, content of a summary may be unique/subjective to the entity 109 (e.g., vernacular, language, and suchlike, used by entity 109) writing the summary, changes made may not be accurately reflected by the summary, an entity 109 may be more inclined to focus on performing the actual change to the program code 105A-n while providing a scant summary using PLFC 112A-n (as generating a summary may be a mentally tedious/time consuming task), a summary may be understandable to a first entity 109A creating the summary but appear vague/confusing to a second entity 109B, and suchlike. Also, an entity 109 may generate a summary that pertains to the changes made during the creation of the latest version compared with the immediately prior version, and does not reflect the change over a sequence of versions, e.g., how a parameter setting was changed over multiple versions of the program code 105A-n.

Further, as mentioned, the programming tool 113/HMI 186 can act as a barrier between the entity 109 and the program code 105A-n, such that the entity 109 is not fully cognizant of the changes made to the program code 105A-n, as the entity 109 is applying the changes via the programming tool 113, rather than viewing the changes directly at the program code 105A-n. Hence, when entity 109 is presented with the updated program code 105B, entity 109 may not be able to readily discern the changes implemented between a current program code 105B and an initial/prior version of the program code 105A.

In an example application, a programming tool 113, e.g., a PLC programming software, can be utilized to create a ladder diagram, whereby the entity 109 utilizes the programming tool 113 to create the sequence of rungs/rules/contacts/tags for which respective PLCs/devices 104A-n are to operate in accordance with their operational state of contacts, physical inputs, outputs, and suchlike. After editing the ladder diagram, the entity 109 is now keen to get the latest version of program code 105A-n implemented and observe the effects on the process being controlled by the PLC programming code 105A-n. Accordingly, the summary may not fully reflect the changes made and/or why, even when using PLFC 112A-n to express the program code 105A-n.

Hence, per the embodiments presented herein to improve the summary generation process, artificial intelligence (AI) and machine learning (ML) processes can be utilized both in real time, and on historical data, to generate one or more summaries that, in a non-limiting list, (a) are generated utilizing PLFC 112A-n, (b) accurately capture/convey the changes made to a program code 105A-n, (c) generates summaries to a standard such as IEC 61131, a DSL, and suchlike, (d) generates a summary that captures changes between two consecutive versions of program code 105A-n and also over a sequence of program codes 105A-n, (e) generates a summary that pertains to a particular entity 109's requirements, e.g., a first entity 109A prefers a detailed change summary while a second entity 109B prefers a sparse summary and/or a summary pertaining to a particular parameter/device, (f) the summary updates as edits are applied to the program code 105A-n and/or the PLFC 112A-n of the summary, commit messages implemented, etc., and suchlike.

Per the various embodiments presented herein, a summary generation system can utilize AI/ML to analyze/process the respective versions of code 105A-n (e.g., identify changes in program/code content such as controller identifiers, IP addresses, device locations, rungs, contacts, tags, process parameters, variables, identifiers, scope, functions, function calls, function blocks, a tag representation, global scope, program scope, an input, an output, a latch operation, a SET operation, a RESET operation, an OPEN operation, a CLOSE operation, a state=TRUE, a state=FALSE, and suchlike) and based thereon, create a digital summary (e.g., summary 140A-n) of the identified changes (e.g., changes 145A-n) in a readily understandable manner (e.g., using PLFC 112A-n). Accordingly, the AI/ML can function in a generative manner creating a summary that, rather than simply being a sequence of parameters, values, etc., presents the changes, parameters, etc., in a manner that is readily understandable to one or more entities 109A-n.

In the event of a summary, or portion of a summary, does not make sense to an entity 109 reviewing/utilizing the summary, an update can be requested, e.g., to provide further context/insight regarding a particular summarized change.

The summary generation system can be implemented on any suitable modalities/content amenable to content change determination and summary. Wherein such modalities/content can be program code (e.g., machine code 108A-n, program code 105A-n, PLFC 112A-n, etc., presented on interface 186), images (such as visual representations of a process, e.g., ladder diagram, and suchlike), audio such as verbal/voice instructions (e.g., change commands regarding operation of a process, such as an entity on the shopfloor interacts with the program via voice commands at HMI 186, rather than entering the changes manually via a keyboard, mouse, etc.), and suchlike.

In a further aspect, AI and ML technologies can be applied to resolve merge conflicts between respective edits being applied by various entities collectively working on a program code/process. For example, AI/ML can generate possible options to a conflict and further present the options in the plain language format PLFC 112A-n. AI/ML technologies can utilize any available information (e.g., in historical data 190, instruction 150A-n, and suchlike) to determine/understand differences/conflicts (e.g., in DIFF/context file 117A-n), such as DSL, best industry practices, information regarding process 101, devices/sensors 103A-n, and/or controllers 104A-n, knowledge from comparisons between program codes 105A-n that did not give rise to a conflict, history in generating summaries 140A-n/changes 145A-n, and suchlike.

To aid understanding, various embodiments, concepts, components, etc., are initially presented herein regarding generation and implementation of AI/ML generated summaries, followed by using AI/ML generated options and summaries to resolve merge conflicts. It is to be appreciated that the various embodiments, components, etc., presented herein regarding resolving merge conflicts can equally apply to generating one or more summaries, and similarly, those various embodiments, components, etc., presented herein regarding generating one or more summaries can be equally applied to generating options/summaries to resolve merge conflicts.

It is to be appreciated that while the various embodiments presented herein are directed towards generation of operational code to be executed in an industrial environment, the various embodiments and concepts are not so limited, and can be equally applied to any environment/application utilizing computer-controlled operation of systems, devices, components, etc. For example, the various embodiments can be utilized in a health care environment (e.g., programming of MRI machines, patient data system, and suchlike), financial (e.g., programming of a banking system), transportation (e.g., programming of a shipping/logistics system), aeronautical (e.g., programming of flight instructions for an aircraft, programming of an air traffic control system), and suchlike. Further, the various embodiments are not limited to program code, but can be applied to any suitable input, such as process/operation files, system plans, piping and instrumentation diagram (P&ID), a design specification document, a conceptual diagram, a network diagram, a system organization diagram, a flow chart from a flow chart/diagramming software, and suchlike, sourced from any level/department of a process, in a non-limiting list, engineering resource planning (ERP), manufacturing execution systems (MES), quality management systems (QES), supply chain planning (SCP), production monitoring, MES automation and orchestration (A&O), asset performance management (APM), hazard analysis and critical control point (HACCP) analysis, Failure Mode and Effects Analysis (FMEA), etc.

Change Summaries Utilizing Generative AI

Figure 1:
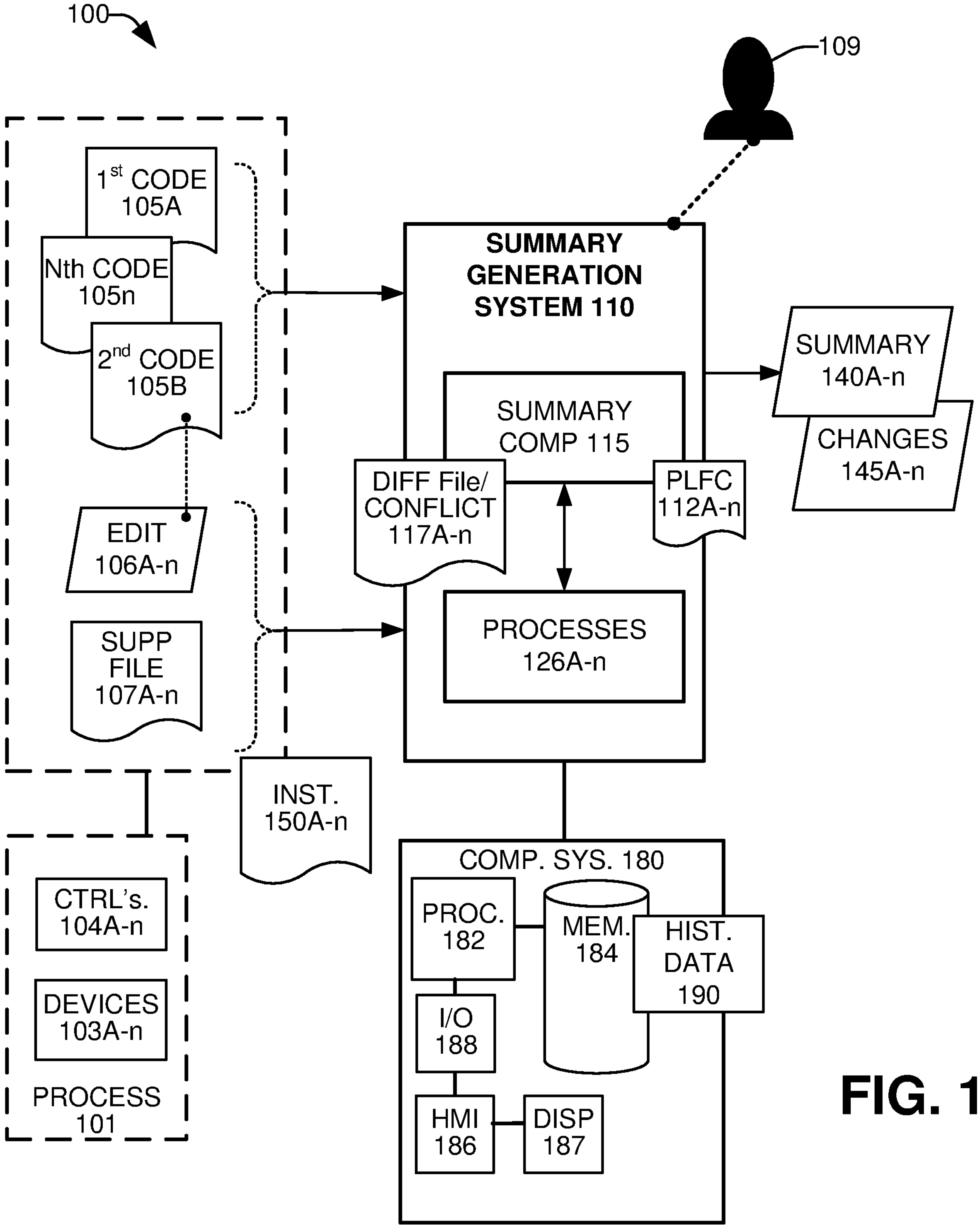
FIG. 1 illustrates a summary generation system configured to automatically generate a change summary, in accordance with one or more embodiments.

Turning to FIG. 1, system 100 illustrates a system to automatically generate a change summary, in accordance with an embodiment. System 100 presents one or more program codes 105A-n, edits 106A-n, and supplemental files 107A-n being submitted into/utilized by a summary generation system (SGS) 110. Programming tool 113, per FIG. 13, can be incorporated into the SGS 110. Program codes 105A-n (aka program files, files, computer program files, project files, etc.) can be software programs, industrial automation code, process files, and suchlike, generated to control/represent operation of one or more devices 103A-n, in a process 101, whereby the respective program codes 105A-n can be implemented on programmable logic controllers (PLCs) 104A-n to control operation of the one or more devices 103A-n. It is to be appreciated that program codes 105A-n can be generated/implemented at any time, such as program code 105A and program code 105B can be consecutive, non-consecutive, can be from the same work project/file, can be generated from different work projects, etc., as required to enable comparison in content of a first program code 105A with a second program code 105B, and a difference in content (if any) to be generated thereon. Edits 106A-n (aka changes, adjustments, amendments, etc.) can be applied to the respective program codes 105A-n to adjust operation of the process 101. Supplemental files 107A-n can include sensor readings, quality control measures, and suchlike, compiled for process 101 and respective devices/equipment 103A-n, wherein the sensor readings, etc., can be reviewed to correlate an effect of applying the program codes 105A-n/edits 106A-n to the process 101 overall and/or a device/equipment 103A-n, such as a change in temperature, a change in a first process parameter resulting from adjustment of a second process parameter due to implementation of an edit 106A-n, and suchlike. In an aspect, supplemental files 107A-n can provide information to the SGS 110 regarding devices 103A-n, PLCs 104A-n, etc., in process 101. As further described, supplemental files 107A-n can be utilized to provide context (e.g., context 241A-n) when a merge conflict (e.g., merge conflict 117A-n) arises. For example, context can be derived from an intent of an entity 109A-n implementing an edit 106A-n, whereby the intent can be determined from the supplemental file 107A-n regarding a current operating condition of process 101 (or one of the devices 103A-n included therein) and the applied edit 106A-n. Regarding supplemental files 107A-n, in an embodiment, supplemental files 107A-n can comprise metadata or other information pertaining to the content of program files 105A-n, for example, where the program file 105A-n is a P&ID drawing, the program file 105A-n can include metadata regarding the respective devices/equipment 103A-n/PLCs 104A-n represented in the P&ID drawing.

SGS 110 can be configured to compare, in accordance with an instruction 150A-n, respective versions/content of the program codes 105A-n in conjunction with one or more edits 106A-n and supplemental files 107A-n, and based thereon, SGS 110 can be configured to generate a summary 140A-n indicating respective changes, edits, amendments, etc., between any two or more versions/instances of program codes 105A-n, a sequence of program codes 105A-n, and suchlike. The summary 140A-n can be presented for review and confirmation, e.g., by entity 109, and in response to approval by entity 109, the summary 140A-n can be stored in conjunction with the program code(s) 105A-n, edits 106A-n, supplemental files 107A-n, to which the summary 140A-n pertains, e.g., to subsequently be included in historical data 190 (e.g., in memory 184). Historical data 190 can comprise respective program codes 105A-n, edits 106A-n, and supplemental files 107A-n, feedback 218A-n, context 241A-n, instructions 150A-n, prompts 215A-n, roles 226A-n, DIFF files/conflicts 117A-n, options 246A-n, summaries 140A-n, changes 145A-n, domain knowledge/information regarding any of devices 103A-n, controllers 104A-n, any industry standard(s) regarding process 101 and devices 103A-n/controllers 104A-n, currently and/or previously submitted/processed by SGS 110, e.g., to assist in a determination of why a first program code 105A may be different to a second program code 105B. Accordingly, SGS 110 has knowledge regarding prior creation and implementation of program codes 105A-n, edits 106A-n, regarding industrial process 101 for which the prior program codes 105A-n were created, as well as equipment that may be present in process 101, and also equipment that may be available but currently is not utilized in process 101.

In an embodiment pertaining to industrial control operations, process 101 can include a number of industrial controllers 104A-n (e.g., PLCs) deployed throughout an industrial plant environment to monitor and control respective industrial systems or processes 101 relating to product manufacture, machining, motion control, batch processing, material handling, or other such industrial functions. Industrial controllers 104A-n typically execute respective control programs 105A-n to facilitate automatic monitoring and control of other devices 103A-n making up the controlled industrial assets or systems (e.g., industrial machines, devices in process 101). One or more industrial controllers 104A-n may also comprise a soft controller executed on a personal computer or other hardware platform, or on a cloud platform. Some hybrid devices may also combine controller functionality with other functions (e.g., visualization). The program codes 105A-n executed by industrial controllers 104A-n can comprise substantially any type of control code capable of processing input signals read from the industrial devices and controlling output signals generated by the industrial controllers 104A-n, including but not limited to LD logic, SFCs, FBDs, structured text, and suchlike.

Industrial devices 103A-n may include both input devices that provide data relating to the controlled industrial systems to the industrial controllers 104A-n, and output devices that respond to control signals generated by the industrial controllers 104A-n to control aspects of process 101. Example input devices can include telemetry devices (e.g., temperature sensors, flow meters, level sensors, pressure sensors, etc.), presence sensing devices (e.g., inductive or capacitive proximity sensors, photoelectric sensors, ultrasonic sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot controllers, valves, pumps, and the like.

Industrial controllers 104A-n may communicatively interface/be communicatively coupled with industrial devices 103A-n over hardwired or networked connections. For example, industrial controllers 104A-n can be equipped with native hardwired inputs and outputs that communicate with the industrial devices 103A-n to effect control of the devices in process 101. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 104A-n can also communicate with industrial devices 103A-n over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 104A-n can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

To enable automated creation of one or more summaries 140A-n, SGS 110 can include a summary component 115 and processes 126A-n. As further described, the summary component 115 can be configured to monitor edits 106A-n being made to a program code 105A-n and generate a summary 140A-n based on the edits 106A-n, wherein, after review/confirmation, the summary 140A-n can function as a "commit message". In another embodiment, summary component 115 can be configured to determine changes/differences 145A-n between a first program code 105A (e.g., an initial code) and second program code 105B (e.g., an updated code), and generate a summary 140A-n based on those changes/differences 145A-n, wherein the summary 140A-n can function as a "change log". In another embodiment, the summary component 115 can be configured to correlate a change 145A-n that occurred in process 101, as determined from supplemental data 107A-n, in relation to a sequence of program codes 105A-n, and hence, identify which program code 105A-n was responsible for the change 145A-n (e.g., change in temperature, velocity, pressure, etc.).

In an embodiment, the summary component 115 can utilize processes 126A-n, wherein, as further described, processes 126A-n comprise respective computer-executable AI and ML components that can be utilized to (a) receive and analyze any of the program codes 105A-n, edits 106A-n, supplemental files 107A-n, prompts 215A-n, feedback 286A-n, options 246A-n, and suchlike, (b) identify respective changes 145A-n applied to the program codes 105A-n, e.g., based on a differences/DIFF file 117A-n, (c) generate one or more summaries 140A-n conveying the respective changes 145A-n, and suchlike.

As mentioned, the program codes 105A-n and PLFC's 112A-n can be any suitable format, such as a digital image, e.g., JPEG (Joint Photographic Experts Group), PNG (Portable Network Graphics), GIF (Graphics Interchange Format), SVG (Scalable Vector Graphics), PDF (Portable Document Format), etc. In an aspect, the digital image can be of a graphical language/representation such as LD, FBD, SFC, and suchlike, e.g., drawn in accordance with IEC 61131-3. The digital image can be a process layout (e.g., generated by programming tool 113), a network diagram, and suchlike.

As further shown, SGS 110 can be communicatively coupled to a computer system 180. Computer system 180 can include a memory 184 that stores the respective computer executable components (e.g., summary component 115, format component 220, prompt component 212, entity component 225, version control component 230, context component 240, conflict component 245, editor component 260, notification component 285, training component 290, and suchlike) and further, a processor 182 configured to execute the computer executable components stored in the memory 184. Memory 184 can further be configured to store any of program codes 105A-n, edits 106A-n, supplemental files 107A-n, operational information regarding controls 104A-n and devices 103A-n, DIFF/Conflict files 117A-n, summaries 140A-n, changes 145A-n, instructions 150A-n, historical data 190, formats 221A-n, context 241A-n, confirmations 275A-n, feedback 286A-n, prompts 215A-n, options 246A-n, similarity indexes $S_{1-n}$, vectors Vn, and suchlike (as further described herein). The computer system 180 can further include a human machine interface (HMI) 186 (e.g., a display, a graphical-user interface (GUI)) which can be configured to present various information including the program codes 105A-n, edits 106A-n, supplemental files 107A-n, operational information regarding controls 104A-n and devices 103A-n, DIFF/Conflict files 117A-n, summaries 140A-n, changes 145A-n, instructions 150A-n, historical data 190, formats 221A-n, context 241A-n, confirmations 275A-n, feedback 286A-n, prompts 215A-n, options 246A-n, similarity indexes $S_{1-n}$, vectors Vn, and suchlike (as further described herein) per the various embodiments presented herein. HMI 186 can include an interactive display/screen 187A-n to present the various information. Computer system 180 can further include an I/O component 188 to receive and/or transmit program codes 105A-n, edits 106A-n, supplemental files 107A-n, operational information regarding controls 104A-n and devices 103A-n, feedback 286A-n, instructions 150A-n, prompts 215A-n, options 246A-n, summaries 140A-n, changes 145A-n, similarity indexes $S_{1-n}$, vectors Vn, and suchlike (as further described herein).

Figure 2:
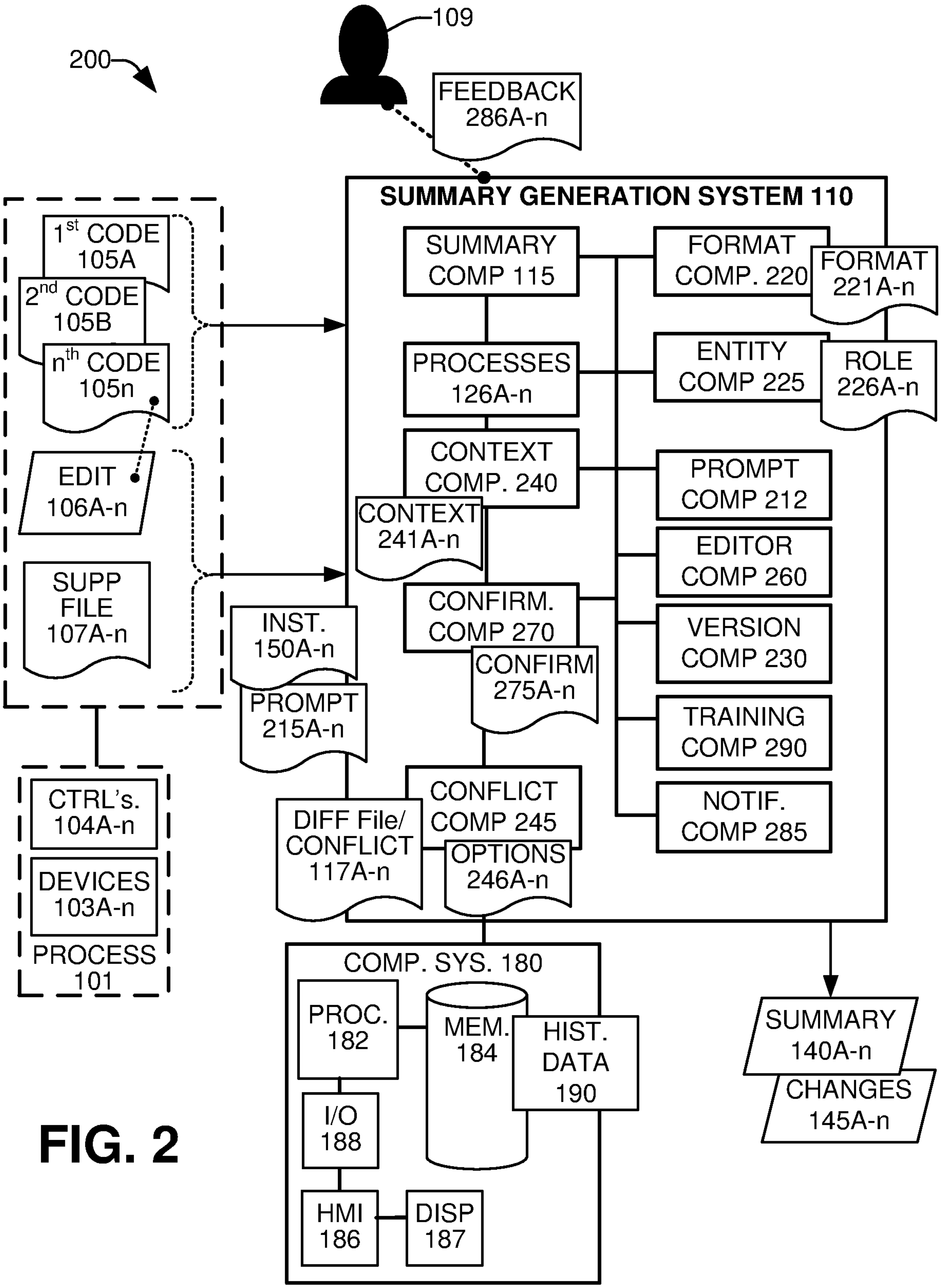
FIG. 2 presents a further detailed view of summary generation system, regarding how one or more program codes can be analyzed and one or more summaries can be generated identifying respective changes/differences, in accordance with at least one embodiment.

Turning to FIG. 2, system 200 presents a further detailed view of system 100, regarding how one or more program codes can be analyzed and one or more summaries can be generated identifying respective changes/differences, in accordance with at least one embodiment.

As previously mentioned, the summary component 115 can be configured to receive an instruction 150A-n, e.g., from entity 109, via HMI 186. In an embodiment, the instruction 150A-n can be directed to presenting an initial/first version of a program code 105A for editing, wherein, in response, the summary component 115 is configured to identify and present the program code 105A on HMI 186 (e.g., via screens 187A-n). In an embodiment, summary component 115 can be configured to monitor edits 106A-n applied to the program code 105A-n, and generate a summary 140A-n based thereon. In another embodiment, summary component 115 can be further configured to compare a first instance of program code, e.g., program code 105A, with a second instance of program code 105B, and determine the respective differences (e.g., in DIFF files 117A-n)/edits 106A-n between the program code 105A and program code 105B.

SGS 110 can further include a format component 220 configured to convert the respective computer instructions between any of machine code 108A-n, program code 105A-n, and PLFC 112A-n, and further apply a respective format 221A-n to any of edits 106A-n, supplemental information 107A-n, DIFF files 117A-n, summaries 140A-n, options 246A-n, feedback 286A-n, prompts 215A-n, context 241A-n, and suchlike. Accordingly, the format component 220 can implement any format 221A-n as required to enable application of processes 126A-n against any of machine code 108A-n, program codes 105A-n, edits 106A-n, summaries 140A-n, etc. For example, format 221M is a machine level (e.g., numerical language) format utilized to generate content as/from machine code 108A-n, format 221F is a formal language format utilized to generate content as/from program code 105A-n, format 221N is a plain language/natural language format/utilized to generate content as/from edits 106A-n, summaries 140A-n, options 246A-n, feedback 286A-n, prompts 215A-n, DIFF files 117A-n, context 241A-n, and suchlike. Processes 126A-n can include a plethora of AI- and ML-based operations and techniques to enable such functionality as determination of contexts 241A-n, analysis of prompts 215A-n, determination/presentation of options 246A-n, creation/presentation of summaries 140A-n, and suchlike, while utilizing formats 221-*n* as implemented by format component 220.

SGS 110 can further include an entity component 225 configured to identify an entity 109/entity role 226A-n for which the summary 140A-n is to be configured, e.g., a process engineer, a quality control engineer, operations manager, machine operator, and suchlike. In an embodiment, role 226A-n of entity 109 can be determined based on their associated credentials available when the entity 109 logs onto the SGS 110 (e.g., via HMI 186). Accordingly, a summary 140A-n can be generated based on any of the role 226A-n, preferred/native language, specific interest, etc., of the entity 109.

As previously mentioned, in an embodiment, the summary component 115 can be configured to receive an instruction 150A-n, e.g., from entity 109, via HMI 186. In an embodiment, the instruction 150A-n can be directed to presenting a first version of a program code 105A for editing, wherein, in response, the summary component 115 is configured to identify the program code 105A and present the program code 105A on HMI 186 (e.g., via screens 187A-n). In a further embodiment, the instructions 150A-n can include a prompt 215A-n, wherein the prompt 215A-n can provide further context regarding how the summary 140A-n is to be determined, presented, level of detail, content, and suchlike. SGS 110 can further include a prompt component 212 configured to process/parse, e.g., in accordance with the prompt 215A-n, the instruction 150A-n to identify context of the instruction 150A-n with regard to how the summary 140A-n is to be generated. In an embodiment, a prompt 215A-n can be entered by the entity 109A-n interacting with the SGS 110 (e.g., prompt 215A-n has a natural language format comparable/similar to the structure of PLFC 112A-n). In another embodiment, a prompt 215A-n can function at the formal language level of a program code 105A-n, wherein the prompt 215A-n having a formal language format can be generated by the prompt component 250 from a prompt 215A-n having the natural language format, and vice-versa (e.g., a prompt 215A-n having a natural language format can function as a meta-prompt). Format component 220 can be utilized to transition a prompt 215A-n between the plain language format and the formal language format, and vice-versa.

SGS 110 can also include an editor component 260 configured to enable an entity 109 to interact with a summary 140A-n. For example, prior to confirming the summary 140A-n is correct, entity 109A can edit the summary 140A-n in accordance with content that entity 109A deems the summary 140A-n should include, content verbiage, etc. The edits 106A-n made to a summary 140A-n can be captured by the editor component 160, saved, and further utilized to train/fine-tune the respective components of SGS 110 and processes 126A-n. In an embodiment, both the original summary 140A and the edited summary 140B can be saved, enabling, for example, future summaries 140C-n to be generated based on the particular preference(s) of entity 109A (per summary 140B) and also use the original summary 140A as a foundation for generating summaries for other entities 109B-n. Alternatively, edited summary 140B can be utilized as a foundation for one or more summaries 140C-n generated for colleagues 109B-n of entity 109A, e.g., language preferences, protocol used where entities 109A-n work, etc.

SGS 110 can further include a version control component 230, wherein version control component 230 can be configured with respective version control systems utilized by an establishment utilizing SGS 110. For example, the version control system 230 can be a distributed version control system (DVCS), such as git, or any other applicable source code management system. In example scenarios of implementation, a peer-to-peer approach can be utilized, a client-server approach can be utilized, and suchlike. In an embodiment, where summaries 140A-n are generated and compiled as respective change histories, the version control component 230 can be utilized to review the history of changes available in summaries 140A-n.

SGS 110 can further include a context component 240 configured to identify a context 241A-n regarding any of program codes 105A-n, edits 106A-n, supplemental information 107A-n, prompts 215A-n, feedback 286A-n, etc. For example, context component 240 can be configured to review an edit 106A-n made to the first instance of program code 105A, and determine a context of the edit 106A-n made to the program code 105A during generation of the second/updated version of program code 105B. Context component 240 can utilize any available knowledge (e.g., as determined by processes 126A-n) regarding program codes 105A-n, edits 106A-n, supplemental information 107A-n, prompts 215A-n, etc., to determine and apply context 241A-n to the various embodiments presented herein. In another example, context component 240 can review the historical data 190 to identify prior program codes 105A-n, edits 106A-n, an observed result/action in supplemental information 107A-n (e.g., effect on process 101 when a similar edit 106A-n was previously applied), roles 226A-n of entities 109A-n along with their prior actions and intents, prior selected options 246A-n, prompts 215A-n/instructions 150A-n, and suchlike, having similarity to a current program code 105C, an edit 106C being applied to the current program code 105C, an intent of the entity 109C applying the edit 106C, a current merge conflict 117A-n (as further described) and how the similar prior merge conflict 117A-n was resolved, and suchlike.

As further described, with the context component 240 deriving context 241A-n, decisions and actions performed by other components in SGS 110 can be improved, thereby increasing the overall success and efficiency of the SGS 110 and the various embodiments presented herein. For example, a context 241A-n derived by processes 126A-n can be further utilized by the processes 126A-n to improve the probability of a successful option 246A-n being identified by conflict component 245 (as further described), an accurate summary 140A-n being generated to describe a program code 105U updated with edits 106U, and suchlike. As further mentioned, by utilizing feedback 286A-n from an entity 109A, the context 241A-n can be further updated (e.g., via processes 126A-n being trained/fine-tuned) in accordance with the feedback 286A-n, enabling continual improvement of the application of the SGS 110 in successfully applying the various embodiments presented herein.

Feedback 286A-n can also function as a notification between SGS 110 and an entity 109A-n.

In an embodiment, the context component 240 and the prompt component 212 can operate in combination (e.g., in conjunction with processes 126A-n) to identify change information pertaining to generating a summary 140A-n. For example, while a prompt 215A-n may particularly define how a summary 140A-n is to be generated, the context component 240 can be utilized by the summary component 115 to identify information/changes 106A-n that are not covered by the prompt 215A-n, but with the application of processes 126A-n, the identified change 106A-n may be of interest to a first entity 109A (e.g., a process engineer, per entity component 225) reviewing the summary 140A-n, while another change 106A-n may be of interest to a second entity 109B (e.g., a quality control engineer, per entity component 225) reviewing the summary 140A-n.

In a further embodiment, SGS 110 can include a confirmation component 270 configured to receive a confirmation 275A-n from entity 109 regarding whether the summary 140A-n is acceptable, e.g., for use as a commit message or a summary of change history (or confirming an option 246A-n). In response to a confirmation 275A from entity 109, the confirmation component 270 can be configured to store the summary 140A with the initial program code 105A and the second program code 105B. Accordingly, over time, as the respective versions of program codes 105A-n are generated, the edits 106A-n can be associated with program codes 105A-n in conjunction with the respective summary 140A-n. In an embodiment, the confirmation component 270 can be configured to parse the confirmation 275A-n for an indication of whether the summary 140A-n (or a particular option 246A-n) is to be implemented or further review/construction of the summary 140A-n (or option 246A-n) is required.

In response to a confirmation 275A not being received regarding the pending summary 140A, any amendments (e.g., edits 106A-n) to the summary 140A-n conducted by entity 109 can be monitored. The summary component 115 can be configured to capture the respective amendments to the summary 140A-n, whereby the amendments can be further utilized by a training component 290 to train the respective processes 126A-n. For example, an entity 109 may tailor a summary to their own particular preference (e.g., a shortened summary versus an in-depth summary, a summary directed to a particular aspect of the process 101, a summary directed towards identifying changes that occurred in the process 101 as a result of implementing second program code 105B, e.g., as identified in supplemental information 107A-n, and suchlike).

In another embodiment, rather than confirmation component 270 being configured to receive a confirmation 275A-n to save a summary 140A-n, the confirmation component 270 can be configured (e.g., in an instruction 150A-n) configuring the confirmation component 270 to automatically save the summary 140A-n once it is generated.

In a further embodiment, entity 109 does not have to commit to application of an edit 106A-n, rather a proposed edit 106A-n, and associated effect thereof, can be evaluated prior to the edit 106A-n being "locked in". the confirmation component 270 can be configured to store current edits 106A-n and summaries 140A-n based thereon as "in-progress", such that before entity 109 fully commits the respective edits 106A-n and/or the summaries 140A-n, the entity 109 can place the edits 106A-n on hold. Entity 109 can initially apply an edit 106A but return to it after a period of time without committing the edit 106A. In an embodiment, entity 109 can apply the edit 106A for which a summary 140A is generated, and upon review, entity 109 deems the edit 106A did not achieve the required effect (e.g., edit 106A affected more than a single device 103A but also affected another device 103B, an input/signal received from a device 103A-n does not have the desired value (e.g., temperature is lower than was anticipated from the edit 106A), and the edit 106A can be rolled back before committing the edit 106A, with summary 140A updating in response to the rollback.

In another embodiment, an instruction 150A-n (e.g., generated with plain language format) can include a request from entity 109 regarding identifying any respective summaries 140A-n where a particular event occurred, such as "Find the committed change(s) in summaries 140A-n where controller 3 was added." Accordingly, the respective identified summaries 140A-n can be presented on display 187 for further review by entity 109. Any pertinent/suitable query can be included in instruction 150A-n. In an aspect, an instruction 150A-n can be created with a human readable format such that while the instruction 150A-n does not specifically specify a particular device (e.g., controller 3 is not specifically identified as controller 3 in the instruction, SGS 110, and included components, has sufficient knowledge/understanding of any of process 101, devices 103A-n, controllers 104A-n, program codes 105A-n, and suchlike, that SGS 110 can identify a specific controller 104A-n (for example) of interest, even though the controller 104A-n is not specifically named. Accordingly, SGS 110 can be configured to parse the human readable format (e.g., as PLFC 112A-n) of instruction 150A-n, such that, while the human readable format renders instruction 150A-n to be an abstraction of the program code 105A-n/machine code 108A-n, SGS 110 is able to recognize a device 103A-n, component 104A-n, etc., of concern in, or to be added to, process 101.

A notification component 285 can be further included in the SGS 110, wherein the notification component 285 can be configured to identify any conflicts/merge conflicts between a first edit 106A being applied by a first entity 109A and a second edit 106B that was previously applied to the program code 105A-n by a second entity 109B. In an embodiment, notification component 285 can generate a notification 286A-n to be presented on the screen 187. In another embodiment, notification component 285 can generate a notification 286A-n to the second entity 109B of the change being implemented by the first entity 109A. Notification 286A-n can be received from the second entity 109B indicating whether the first edit 106A can be applied. For example, second entity 109B can respond with a notification 286A-n that the proposed edit 106A conflicts with edit 106B, and edit 106A should not be implemented (as further described).

Figure 3:
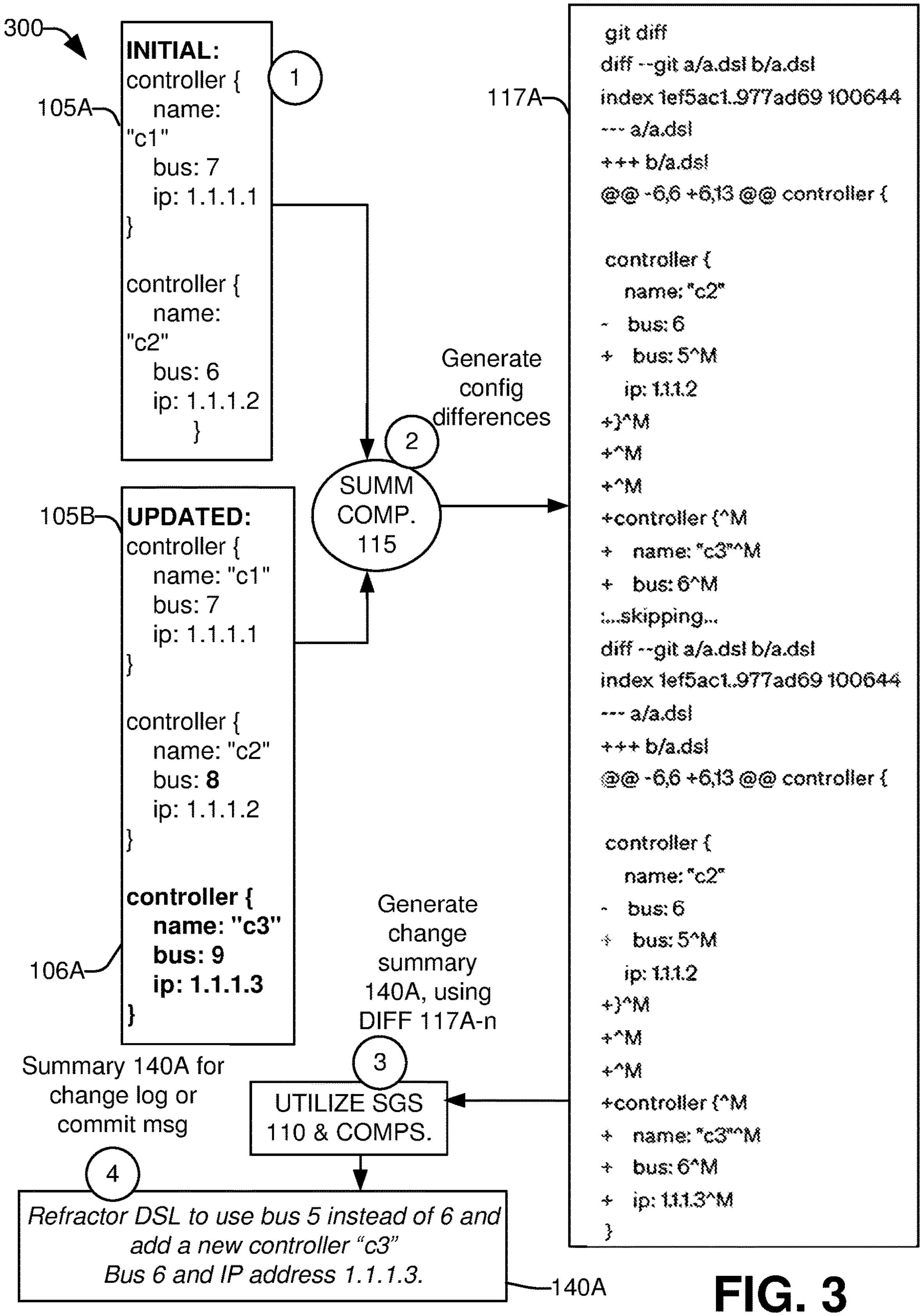
FIG. 3 presents a schematic illustrating a workflow for generation of a human readable summary (e.g., a commit message) based on respective changes made to a program file, in accordance with an embodiment.
Figure 4:
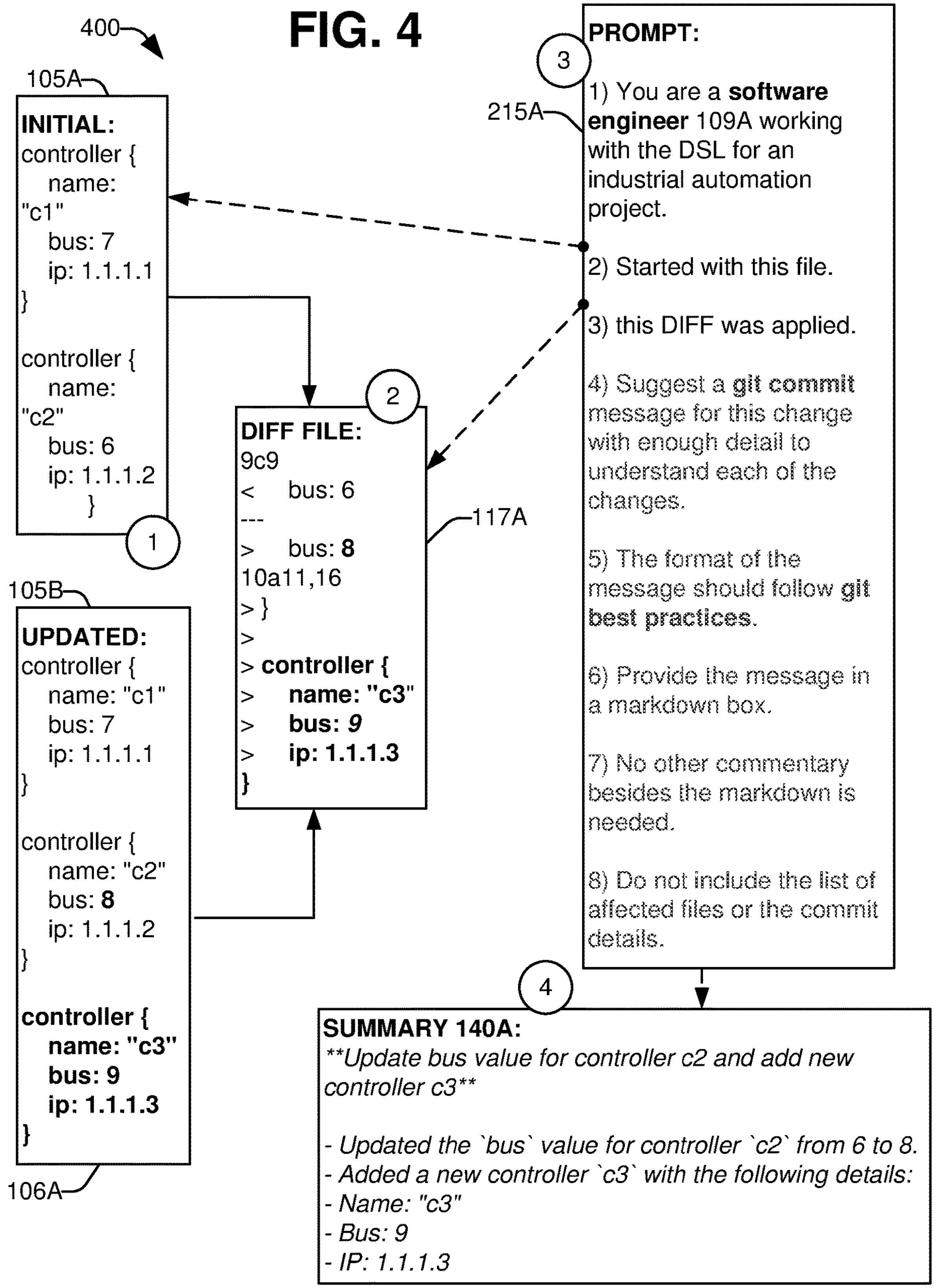
FIG. 4 presents a schematic illustrating a summary being generated, in accordance with an embodiment.

Turning momentarily to FIGS. 3 and 4, schematic 300 illustrates a workflow for generation of a human readable summary (e.g., a commit message) based on respective changes made to a program file, in accordance with an embodiment. FIG. 4, schematic 400 illustrates a summary being generated, in accordance with an embodiment.

As shown, at 300-(1) a first program code 105A (aka original code, initial code) is being edited/updated with edits 106A by entity 109 to create updated/second program code 105B.

At 300-(2), summary component 115 detects (e.g., in real-time or post change implemented) the respective edits 106A being made (as highlighted in bold on FIG. 4) and creates a DIFF file 117A representing the differences between program code 105A and potential program code 105B generated by application of the edits 106A.

At 300-(3), the DIFF file 117A can be applied to SGS 110 and the respective components included therein can/may be utilized to generate the summary 140A-n.

At 300-(4), the generated summary 140A-n can provide details of the determined changes/edits 106A-n in a plain language form. Hence, while an entity 109A-n may not be able to understand the content of DIFF file 117A, the summary 140A presents the respective changes with easy to understand content, such that the entity 109A applying the edits 106A-n can quickly review and confirm summary 140A has captured the edits 106A determined for program code 105B versus program code 105A.

Turning to FIG. 4, at 400-(1) an initial/first program code 105A is being edited/updated to create updated/second program code 105B.

At 400-(2), summary component 115 detects (e.g., in real-time or post change implemented) the respective edits 106A being made (as highlighted in bold on FIG. 4) and creates a DIFF file 117A representing the differences between program code 105A and program code 105B.

At 400-(3), summary component 115 is further configured to receive a prompt 215A, wherein prompt 215A provides instruction/context regarding how summary component 115 is to generate the summary 140A. As shown, prompt 215A includes instruction regarding the role 226A of an entity 109A (e.g., software engineer) for which the summary 140A should be generated, in conjunction with git formatting/best practices, summary 140A-n is to be presented as a dropdown box on screen 187, no commentary is required, and provision of a list of affected files (e.g., versions of program codes 105A-n) is not required, etc.

At 400-(4), in accordance with the prompt 215A, summary component 115 has generated summary 140A from DIFF 117A indicating that in the updated/second program code 105B, the bus value for controller 104B (controller C2) has been updated and a new controller 104C (controller C3) has been added. As shown, the edits 106A-n are applied to the respective parameters (e.g., controller name, bus ID, IP address, and suchlike), and can be difficult to identify when comparing respective versions of program codes. By utilizing the summary component 115, the identified changes 106A-n can be expressed in a summary 140A-n in a human readable format.

As previously mentioned, an instruction 150A-n can be directed towards comparing edits 106A-n that occurred between two program codes 105A-n, to generate DIFF file 117A. In an example scenario of application, the edits 106A can be applied to a first program code 105A to create the updated version, second program code 105B, whereby the edits 106A-n can be captured in real-time, e.g., as they are being implemented, or upon completion of the edits 106A-n when the second program code 105B is created, e.g., as captured as a commit message. In another example embodiment, entity 109 can create instruction 150A-n that identifies two program codes 105X and 105Y, whereby program codes 105X and 105Y can be adjacent to each other in a sequence of program codes 105A-n, or the program codes 105X and 105Y can be separated by intermediate program codes 105A-n that were created between the moment that program codes 105X and 105Y were created. In a further example of implementation, instruction 150A-n can identify a sequence of program codes, e.g., program codes 105H to 105P, whereby the instruction 150A further indicates a requirement for the summary component 115 to generate a summary 140A-n that summarizes the edits 106A-n implemented throughout the sequence of program codes 105H to 105P, e.g., as captured as a change history. In another embodiment, instruction 150A-n can be configured to instruct summary component 115 to filter/focus on particular kinds of changes, such as "Only create a history of all the changes to controller A. Ignore any other differences/changes/edits 106A-n". In an embodiment, an instruction 150A-n can include an instruction for summary component 115 to identify in a summary 140A-n the different locations in program codes 105A-n where the respective changes 106A-n can be identified, wherein the respective locations can be hyperlinked in the summary 140A-n, enabling entity 109 to further review the respective changes 106A-n (e.g., selection of the hyperlink presents the program code 105A-n of concern on display 187).

In a further embodiment, during initial implementation, the respective processes 126A-n do not have to fully understand the DSL in program codes 105A-n/edits 106A-n/supplemental information 107A-n/summaries 140A-n, as respective iterations of the processes 126A-n on the program codes 105A-n, etc., increases the AI/ML knowledge of the processes 126A-n.

In a further embodiment, as entity 109 is implementing edits 106A-n, the summary component 115 can be configured to determine what edits 106A-n are currently being implemented and generate any edits previously made that pertain to the current edits 106A-n. For example, the summary component 115 can be configured to identify other instances of program codes 105A-n for which the edit 106A applies, e.g., a parameter being changed in edit 106A was previously changed in a prior version of the program code 105P. The summary component 115 can be further configured to obtain the prior summary 140P generated for program code 105P, and present the summary 140P as information regarding why the prior change 106P was made, e.g., "entity 109B changed parameter setting X on date MM/DD/YYYY" in conjunction with the summary 140P identifying the change and any context pertaining to the change 106P. Accordingly, entity 109A is informed of the change 106P in conjunction with the previously created summary 140P generated for the change 106P, wherein summary 140P can be automatically created by SGS 110 during the application of change 106P.

In a further embodiment, prior to presenting summary 140P to entity 109A, summary component 115 can configure summary 140P in accordance with user preference(s) of entity 109A. In another embodiment, entity 109A can instruct summary component 115 to compare an effect of implementing the current changes 106A on the prior program code 105P. For example, prior program code 105P may have been generated ten versions prior to the pending current program code 105B (e.g., pending as the current edits 106B may not have yet been applied), such that the summary component 115 can generate a summary of changes 106A-n that occurred between program code 105P and the current program code 105B. Hence, the summary component 115 can automatically generate summaries 140A-n having context regarding program codes 105A-n that are not immediately consecutive/adjacent with regard to time, and rather the summary component 115 can generate a summary 140B that utilizes both the prior summaries and identified changes.

Using Generative AI to Mitigate Merge Conflicts

As previously mentioned, when multiple entities 109A-n are working on the same project, it is possible for one or more merge conflicts to occur. Merge conflicts occur when one or more edits 106A-n to program code 105A-n by a first entity 109A cannot be reconciled and/or combined with one or more edits 106A-n to program code 105A-n by a second entity 109B. Further, reconciling a merge conflict by an entity 109B can be difficult/complex as entity 109B may not be familiar with the structure, format, DSL syntax, etc., of the program code 105A-n. For example, entity 109B utilizes a ladder logic programming tool 113 to interact with program code 105A-n, rather than directly interacting with the program code 105A-n itself.

In an embodiment, one or more options 246A-n (aka solutions, suggestions, recommendations) to resolve a merge conflict can be generated and presented on the screen 187, wherein the merge conflict can be expressed via differences presented in a DIFF file 117A-n. Accordingly, a DIFF file 117A-n is used herein to also represent a conflict. Options 246A-n can include different ways for the conflict to be resolved, wherein a conflict component 245 can be configured to generate/identify respective options 246A-n to the conflict. Options 246A-n can be constructed by the conflict component 245 to be in human readable format PLFC 112A-n such that entity 109A and/or 109B can readily understand the conflicts and the potential options 246A-n derived by the conflict component 245 (e.g., in conjunction with context component 240, format component 220, and processes 126A-n).

In an embodiment, respective processes 126A-n can be utilized to determine the respective options 246A-n. In a further embodiment, the various reasons/feedback 286A-n received from the second entity 109B can be reviewed/parsed in accordance with the respective options 246A-n presented. For example, second entity 109B can indicate an option 246S generated by the conflict component 245 "will never work and here is why . . . " as identified in feedback 286A-n. The feedback 286A-n can include content regarding an intent of an entity 109A-n in applying a particular edit 106A-n or selecting a particular option 246A-n (e.g., "do not adjust controller 'c3', pump 103P is not performing incorrectly, it is a function of the oil temperature, we need to adjust controller 'c12' to increase oil temperature and leave 'c2' at current settings"; "adding controller 'c5' to control operation of new pump 103R"; "need to increase temperature at furnace 103T to improve metal flow in die casting cavity 103C"; and suchlike). The respective processes 126A-n can be re-trained/fine-tuned in accordance with the feedback 286A-n for the proposed option 246S being incorrect, thereby further improving the ability of the SGS 110 to identify/generate workable options 246A-n to a merge conflict, per DIFF file 117A-n. Accordingly, by implementing processes 126A-n, a collection of options 246A-n can be rapidly determined in comparison with a conventional process involving entity 109A directly analyzing the respective codes 105A-n and edits 106A-n to identify differences between the respective codes 105A-n. For example, it would be an inordinate task for entity 109A to review respective codes 105A-n, edits 106A-n, and historical data 190 to identify the sequence of edits 106A-n that occurred between a given start and end time. The complexity of the task is further exacerbated by entity 109A does not interact with the program code 105A-n directly, but rather, applies the edits 106A-n with a natural language format 221A-n via the programming tool 113. Hence, as previously mentioned, entity 109A may be completely overwhelmed and incapable of identifying the respective edits 106A-n as well as potential options 246A-n to the conflict in DIFF file 117A-n.

Figure 5A:
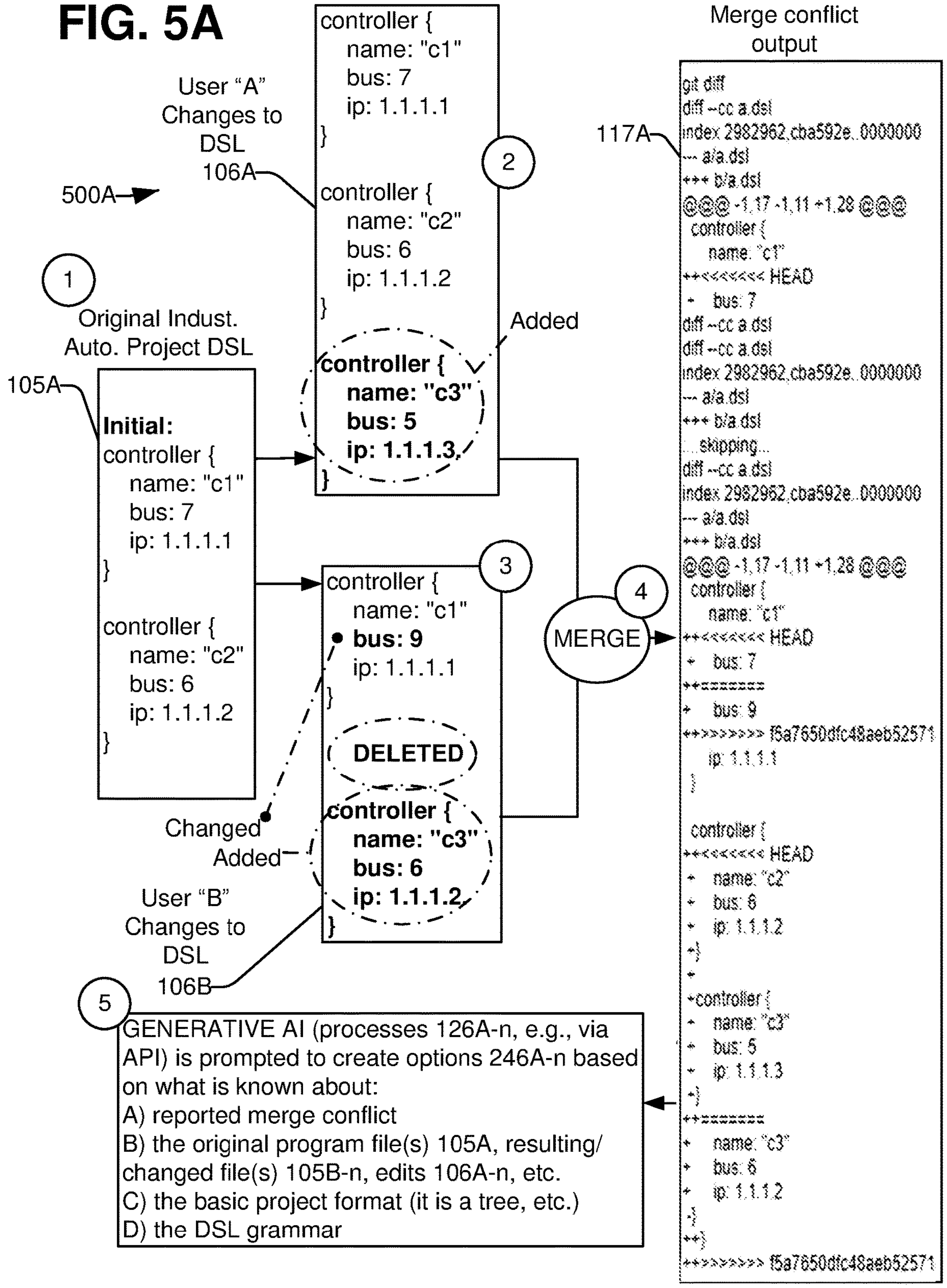
FIGS. 5A and 5B present workflows illustrating respective processes in resolving a merge conflict, in accordance with one or more embodiments.
Figure 5B:
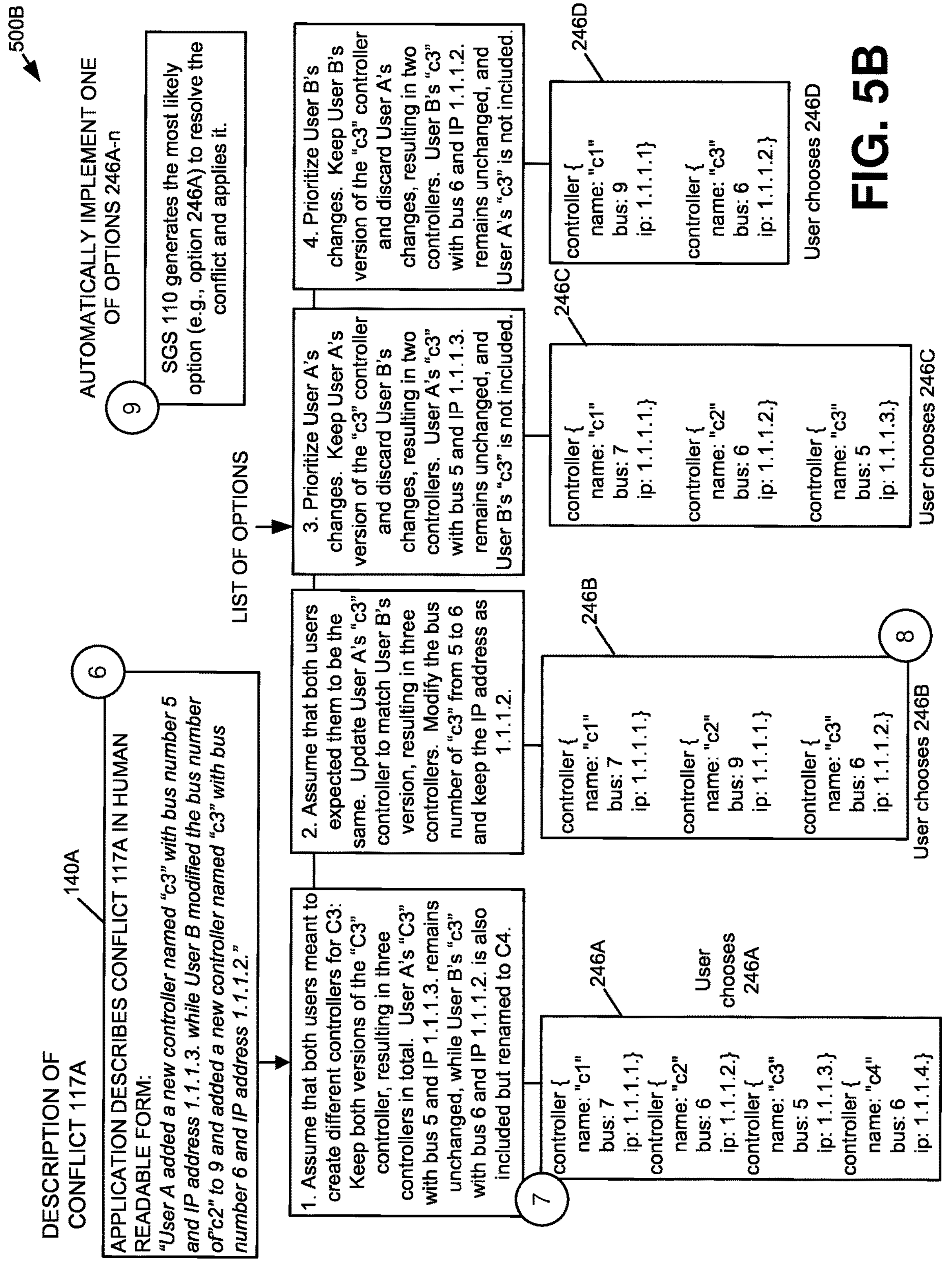

Turning to FIGS. 5A and 5B, workflows 500A and 500B illustrate respective processes in resolving a merge conflict, in accordance with one or more embodiments.

At 500-(1), an initial program code 105A is obtained, wherein program code 105A can be an automation project program code having a DSL syntax.

At 500-(2), a first entity 109A (e.g., user "A") intends to implement edits 106A to the program code 105A. As shown in the example scenario presented in FIG. 5A, edits 106A comprise adding a new/additional controller "c3", with a bus setting of 5, and an IP address of 1.1.1.3. (as highlighted in bold).

At 500-(3), a second entity 109B (e.g., user "B") intends to implement edits 106B to the program code 105B, wherein edits 106B comprise editing the "c1" controller with a bus setting of 9, deleting controller "c2", and adding a new controller "c3" with bus setting of 6, and an IP address of 1.1.1.2., wherein controller "c3" to be implemented by the second entity 109B is different to the controller "c3" to be implemented by the first entity 109A.

At 500-(4), when edits 106A and 106B are merged, conflict component 245 detects a merge conflict, as represented in the DIFF file 117A.

At 500-(5), the program code 105A, edits 106A and 106B, and DIFF file 117A can be applied to the conflict component 245 for resolution. As previously mentioned, conflict component 245 can be configured to utilize one or more processes 126A-n to generate various proposed options 246A-n regarding how the conflicts can be resolved. In an embodiment, a prompt 215A-n can be configured to provide to the conflict component 245 any available knowledge regarding the conflict, such as the program code 105A, edits 106A and 106B, DIFF file 117A, information regarding the merge from GIT, format of the project (e.g., is it a tree, etc.), the DSL grammar, and suchlike.

Turning to FIG. 5B, at 500-(6), conflict component 245, in conjunction with summary component 115 and processes 126A-n can generate a summary 140A of the conflict 117A, e.g., in accordance with prompt 215A-n. Per the example scenario, summary 140A can be generated in human readable form "User A added a new controller named 'c3' with bus number 5 and IP address 1.1.1.3. while User B modified the bus number of 'c2' to 9 and added a new controller named 'c3' with bus number 6 and IP address 1.1.1.2.". Summary 140A can be presented in a plain language utilizing the same previously described processes configured to generate summaries 140A-n akin to the natural language of PLFC 112A-n.

At 500-(7), the conflict component 245, in conjunction with summary component 115 and processes 126A-n can be further configured to identify various options 246A-n for implementation to resolve the conflict. Options 246A-n can be presented in plain language utilizing the same previously described processes configured to generate summaries 140A-n akin to the natural language of PLFC 112A-n. Accordingly, the embodiments presented herein provide sufficient context 241A-n in an option 246A-n enabling entity 109 to readily discern differences and preferences in applying a first option 246A over a second option 246B. Conventional/traditional systems only provide an option to keep changes from a first user, keep changes from a second user, keep both changes, but with no context 241A-n that enables an informed decision regarding which of option 246A, option 246B, or both, to be made. The human readable context provided by the various embodiments presented herein enable informed decisions regarding which of option 246A, option 246B, or both, to be made. Furthermore, the respective embodiments presented herein enable options 246A-n to be presented with a higher level of granularity of interaction/content than is available with a conventional/traditional system, such as an option 246A can be presented that retains the intent of a first entity 109A but can be reworked to include an edit(s) 106A-n desired/intended by a second entity 109B, whereby a presented option 246A can be generated to comprise the intent of the first entity 109A in conjunction with the desired edit 106B, where the intent of the first entity 109A does not conflict with the effect of adding the edit 106B of the second entity.

Per the examples presented, a first option 246A comprises: "Assume that both entities 109A and 109B meant to create different controllers for C3: Keep both versions of the 'C3' controller, resulting in three controllers in total. Entity 109A's 'C3' with bus 5 and IP 1.1.1.3. remains unchanged, while Entity 109B's 'c3' with bus 6 and IP 1.1.1.2. is also included but renamed to 'C4', with the corresponding possible program code 105B presented below."

A second option 246B comprises: "Assume that both entities 109A and 109B expected the edits 106A and 106B to result in the same configuration. Update entity 109A's 'c3' controller to match entity 109B's version, resulting in three controllers. Modify the bus number of 'c3' from 5 to 6 and keep the IP address as 1.1.1.2., with the corresponding possible program code 105C presented below."

A third option 246C comprises: "Prioritize entity 109A's changes 106A. Keep entity 109A's version of the 'c3' controller and discard entity 109B's changes. Entity 109A's 'c3' with bus 5 and IP 1.1.1.3. remains unchanged, and Entity 109B's 'c3' is not included, with the corresponding possible program code 105D presented below."

A fourth option 246D comprises: "Prioritize entity 109B's changes 106B. Keep entity 109B's version of the 'c3' controller and discard entity 109A's changes 106A, resulting in two controllers, entity 109B's 'c3' with bus 6 and IP 1.1.1.2. remains unchanged, and entity 109A's 'c3' is not included, with the corresponding possible program code 105E presented below."

The respective options 246A-n can be presented (e.g., on screen 187) to entity 109A and/or 109B for review and selection, whereby the respective options 246A-n can be presented in accordance with prompt 215A-n. In an embodiment, the respective options 246A-n can be ranked in order of probability of implementation. For example, the conflict component 245 can be configured to review historical data 190 to identify any prior conflict (e.g., based on content of program codes 105A-n, edits 106A-n, supplemental data 107A-n) having similarity to the current conflict, and based thereon, which prior option(s) were selected, and how they correlate to the current options 246A-n.

As 500-(8), the respective option 246A-D can be selected by either of entities 109A or 109B, whereupon the program code 105B-E respectively associated with the respective option 246A-D can be presented on screen 187 in conjunction with a summary 140A-n describing the effect of implementing the respective option 246A-D. Entity 109A/109B can respectively opt to implement the selected option 246A-D, can further interact with the chosen option 246A-D (e.g., further amend the changes 106A-n proposed by conflict component 245 and further reapply the amended changes 106A-n to the conflict component 245 for further analysis by the conflict component 245 regarding the effect of implementing the proposed amended changes 106A-n, further amend the summary 140A-D pertaining to the amended changes 106A-n, and suchlike).

In a further embodiment, as shown in FIG. 5B, at 500-(9), the conflict component 245, in conjunction with summary component 115 and processes 126A-n, can be further configured to implement one or more processes 126A-n to automatically identify an option in the available options 246A-n that has the highest probability of resolving the conflict in a manner most likely to be approved by entity 109A and/or 109B. The conflict component 245 can be further configured to automatically implement the identified option 246A-n. As previously described, knowledge of process 101 (e.g., historical data 190) and context 241A-n can be utilized by the conflict component 245, summary component 115, and/or processes 126A-n to automatically identify and implement an option 246.

In a further embodiment, the conflict component 245 may not have sufficient information available to automatically generate any of the respective options and/or implement an option 246A-n having the highest probability of success. In response to such a determination by the conflict component 245, the conflict component 245 can be configured to request further information/feedback 286A-n from the one or more entities 109A-n to provide conflict component 245 with further context 241A-n regarding identifying one or more options 246A-n and/or automatically implementing an option 246A-n.

In a further embodiment, prior to actual implementation of a respective option 246A-n, the one or more options 246A-n can be applied to the program code 105A to enable entity 109A-n to review the effect of implementing the respective option 246A-n. The respective effect can be presented (e.g., via screens 187) to the entity 109A-n in conjunction with an annotation comprising a summary 140A-n of the effect of applying the respective option 246A-n, and further, context as to why a respective option 246A-n was generated.

In an embodiment, context 241A-n relevant changes can be implemented by conflict component 245. For example, entity 109A can generate in an instruction 150A-n or a prompt 215A-n for conflict component 245 to implement an edit 106A provided by entity 109A but not implement the edit 106B provided by entity 109B. With the edit 106A implemented, the conflict component 245 can be configured to re-run one or more portions of the merge conflict resolution process to identify a further option 246A-n based on the edit 106A being applied.

In a further embodiment, an option 246A-n can be presented, e.g., on screens 187, which an entity 109A-n can apply a further edit 106A-n, a new summary 140A-n can be generated for the option 246A-n edited by entity 109A-n, newly edited program code 105A-n presented, and suchlike.

In a further embodiment, conflict component 245 can be configured to review prior edits 106A-n applied to any of prior versions of program code 105A-n, prior summaries 140A-n, prior selected options 246A-n, and suchlike, and in response to the review, conflict component 245 can further determine/recommend options 246A-n, etc., for the entity 109A-n to apply. It is to be appreciated that while the foregoing relates to prior edits 106A-n, the edits can also arise in the future, as subsequent edits are made, e.g., as a program code 105A-n undergoes further review and/or amendment.

In another embodiment, as previously mentioned regarding interaction by an entity 109A with a summary 140A-n functioning as a commit message, when entity 109A is interacting with the program code 105A to potentially generate an updated program code 105B, entity 109A can generate a summary 140A detailing their proposed edits 106A-n and the context for conducting them. For example, a new controller "c3" is being added to control speed of a pump 103P. Similarly, when entity 109B is interacting with the program code 105A to potentially generate an updated program code 105C, entity 109B can generate a summary 140B detailing their proposed edits 104A-n and the context for conducting them. For example, a new controller "c3" is being added to control temperature of a furnace 103F. Conflict component 245 in conjunction with context component 123 and processes 126A-n can identify that while two instances of controllers "c3" are being added, the individual intents of entities 109A and 109B is to add two distinct controllers, and accordingly, the conflict component 245 can generate an option 246A-n indicating "it is determined that while two controllers 'c3' were added, the determined intent is to incorporate new controllers for distinct operations, hence controllers 'c3' and 'c4' have been added in this option".

It is to be appreciated that the various embodiments, concepts, components, etc., presented herein regarding resolving merge conflicts can equally apply to generating one or more summaries 140A-n, and similarly, those various embodiments, concepts, components, etc., presented herein regarding generating one or more summaries 140A-n can be equally applied to resolving merge conflicts 117A-n.

AI and ML Processes

Processes 126A-n can include a plethora of AI- and ML-based operations and techniques to enable such functionality as determination of contexts 241A-n, analysis of prompts 215A-n, determination/presentation of options 246A-n, creation/presentation of summaries 140A-n, and suchlike. It is to be appreciated that the various processes 126A-n and operations presented herein are simply examples of respective AI and ML operations and techniques, and any suitable AI/ML model/technology/technique/architecture can be utilized in accordance with the various embodiments presented herein. Processes 126A-n can be implemented based on application of terms, codes, statements, labels, etc., in program codes 105A-n, edits 106A-n, supplemental files 107A-n, prompts 215A-n, context 241A-n, historical data 190, feedback 286A-n, format 221A-n, instructions 150A-n, DIFF files/conflicts 117A-n, options 246A-n, and suchlike. Summary component 115 can be configured to implement processes 126A-n in conjunction with any components included in SGS 110. An example process 126A-n can include a vectoring technique such as bag of words (BOW) text vectors, and further, any suitable vectoring technology can be utilized, e.g., Euclidean distance, cosine similarity, etc. Other suitable AI/ML technologies/processes 126A-n that can be applied include, in a non-limiting list, any of vector representation via term frequency-inverse document frequency (tf-idf) capturing term/token frequency in the program codes 105A-n, edits 106A-n, etc., versus content in historical data 190, etc. Other applicable AI/ML technologies include, in a non-limiting list, neural network embedding, layer vector representation of terms/categories (e.g., common terms having different tense), bidirectional and auto-regressive transformer (BART) model architecture, a bidirectional encoder representation from transformers (BERT) model, a diffusion model, a variational autoencoder (VAE), a generative adversarial network (GAN), a language-based generative model such as a large language model (LLM), a generative pre-trained transformer (GPT), a long short-term memory (LSTM) network/operation, a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike. Accordingly, in an embodiment, implementation of the respective components included in SGS 110, e.g., summary component 115, context component 240, conflict component 245, and suchlike, enables plain/natural language programming/annotation/correlation of the program codes 105A-n with respective knowledge (e.g., edits 106A-n, context 241A-n, and suchlike) pertaining to the summary generation processes/merge conflict resolution processes presented herein, to create summaries 140A-n and options 246A-n utilizing PLFC 112A-n.

Language models, LSTMs, BARTs, etc., can be formed with a neural network that is highly complex, for example, comprising billions of weighted parameters. Training of the language models, etc., can be conducted, e.g., by summary component 115, with datasets, whereby the datasets can be formed using any suitable technology, such as historical data 190 (e.g., previously processed program codes 105A-n, edits 106A-n, control data 104A-n, device data 103A-n, and suchlike), context 241A-n, and suchlike. Further, as previously mentioned, program codes 105A-n, edits 106A-n, DIFF file/conflict file 117A-n, historical data 190, options 246A-n, feedback 286A-n, and suchlike, can comprise text, alphanumerics, numbers, single words, phrases, short statements, long statements, expressions, syntax, source code statements, machine code, etc. Fine-tuning of a process 126A-n can comprise application of historical data 190, feedback 286A-n, prompts 215A-n, context 241A-n, other knowledge available to SGS 110, and suchlike, to the process 126A-n, the process 126A-n is correspondingly adjusted by application of the historical data 190, etc., such that, for example, weightings in the respective process 126A-n are adjusted by application of the historical data 190, feedback 286A-n, and suchlike. As new information (e.g., a program code 105A-n is processed) historical data 190 can be updated accordingly, and further, processes 126A-n fine-tuned.

In an example embodiment, the summary component 115 can be configured to identify one or more changes 145A-n/edits 106A-n (e.g., in DIFF file 117A-n) for presentment in a summary 140A-n, and determine/infer PFLC 112A-n that best presents the change 145A-n, etc., in accordance with the preferences/requirements in instruction 150A-n/prompt 215A-n. Similarly, the conflict component 245 can be configured to determine one or more options 246A-n that are suitable to address a merge conflict 117A-n. In an embodiment, where the summary component 115/conflict component 245 is unable to readily identify PFLC 112A-n/option 246A-n, summary component 115/conflict component 245 can utilize a vector analysis process 126A to assist with the determination. The vector analysis process 126A can utilize information such as prior summaries 140A-n utilized for an entity 109A-n, prior options 246A-n that were implemented (e.g., in historical data 190), and suchlike. Accordingly, the summary component 115/conflict component 245 can intelligently generate summaries 140A-n and options 246A-n. In an example embodiment, the vector analysis process 126A can perform similarity analysis between a possible phrasing/structure PFLC 112A-n in summary 140A-n and/or in options 246A-n, and a prior utilized phrasing in historical data 190. In an embodiment, each respective feature/content in each of program files 105A-n, edits 106A-n, changes 145A-n, DIFF file/conflicts 117A-n, historical data 190, etc., can be defined/represented as a vector Vn wherein the vector schema utilized can be any of a two-dimensional vector through to a multi-dimensional vector (e.g., a vector of many dimensions). The greater the similarity between a first vector representation V1 and a second vector representation V2 (e.g., of information in historical data 190), the greater the inference that the element represented by the first vector representation V1 relates to the element represented by the second vector V2. Respective vectors Vn can be generated using any suitable approach, e.g., respective features/content in any of program files 105A-n, edits 106A-n, changes 145A-n, DIFF file/conflicts 117A-n, historical data 190, and suchlike, can be expressed numerically with one or more portions of alphanumerics/text/numeric/symbols/content/annotations of the respective content/features in program files 105A-n, edits 106A-n, changes 145A-n, DIFF file/conflicts 117A-n, historical data 190, etc., being presented as vectorized content. Vector analysis process 126A can further comprise determining a degree of similarity S (e.g., a similarity index $S_{1-n}$) between vector representation V1 of a feature in the changes 145A-n, edits 106A-n, conflicts 117A-n, context 241A-n, etc., and a vector representation V2 of feature in the historical data 190 which have been previously identified/vectorized. Similarity $S_{1-n}$ can be assessed based on similarity/dissimilarity as identified based on distance between respective values of vectors Vx., e.g. V1 and V2.

In response to vector analysis process 126A does not identify respective vectors having an acceptable degree of similarity, the context component 240 can be configured to request further context from entity 109A-n regarding the reason for the one or more edits 106A-n.

Figure 6:
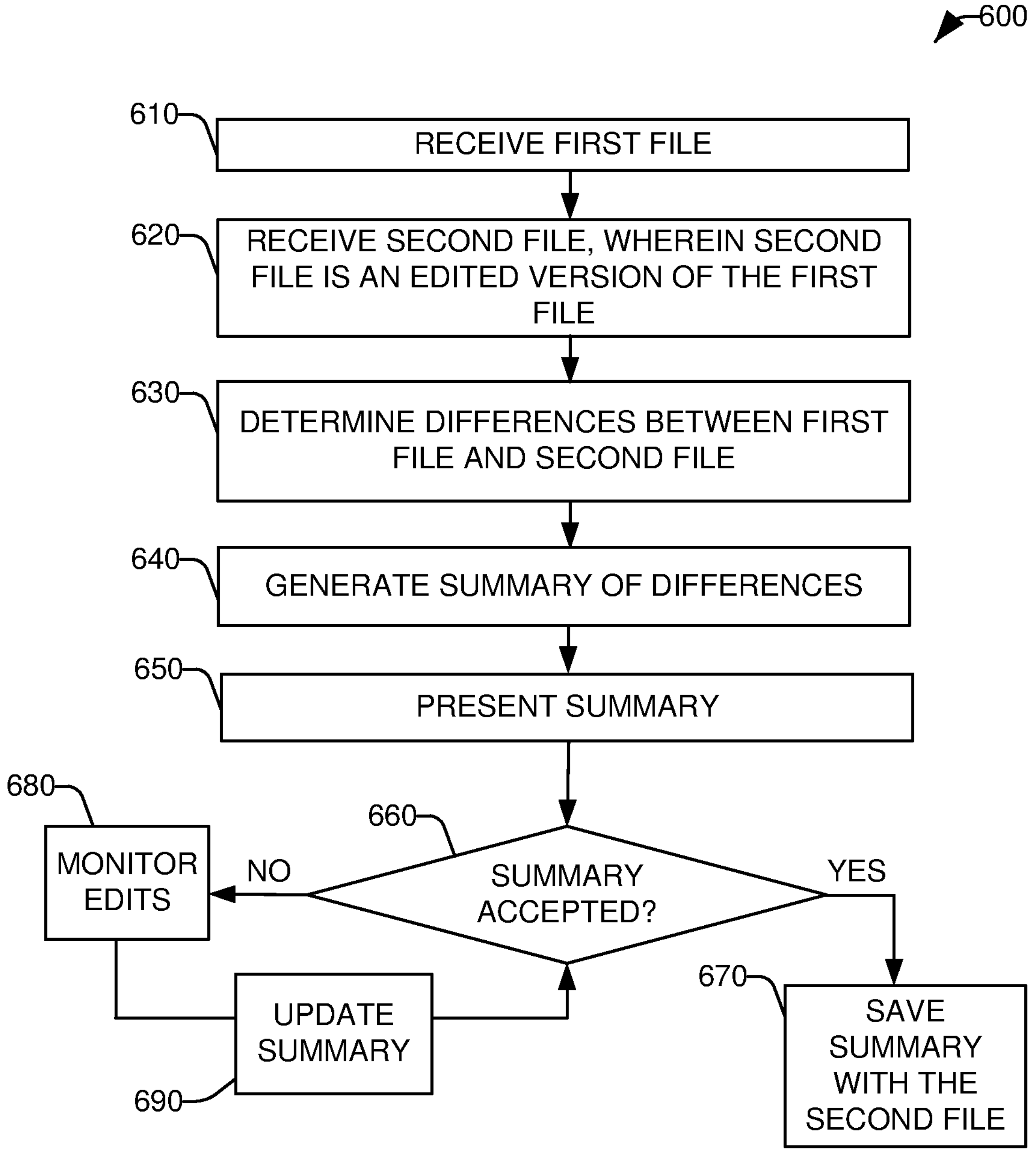
FIG. 6, presents a computer-implemented process for generating a summary of changes, in accordance with an embodiment.

FIG. 6, presents a computer-implemented process 600 for generating a summary of changes, in accordance with an embodiment.

At 610, a first program file (e.g., program code 105A) can be received at a summary generation system (e.g., SGS 110), wherein the first program file can be program code utilized to control a device, component, etc., (e.g., devices 103A-n, controllers 104A-n, and suchlike) included in an industrial process (e.g., industrial process 101). The first program file can be retrieved in response to an instruction (e.g., instruction 150A-n) received from an entity (e.g., entity 109A) via an interface (e.g., via HMI 186).

At 620, a second program file (e.g., program code 105B) can be received at the SGS. In an embodiment, the second program file (e.g., a second version of a program file) can comprise an edited version of the first program file (e.g., a first version of a program file), generated as a result of the entity interacting with the first program file. In an aspect, the interaction can be the entity applying an edit (e.g., edit 106A-n) to the first program file to generate the second program file. In another aspect, the second program file may be a later instance of the same general program code that the first program file is also based on, such that the entity is performing a comparison between content of the first program code and the second program code, e.g., as a commit message. As previously described, in a version history of the program file, the first program file and the second program file can be adjacent, such that the second program file is a direct amendment of the first program file. Alternatively, the first program file and the second program file can be separated by intervening iterations/versions of the program code. In a further aspect, the entity can apply an instruction (e.g., instruction 150A-n) to the SGS instructing the SGS to generate a summary detailing the differences between the first program file and the second program file. In another aspect, the entity can apply an instruction (e.g., instruction 150A-n) to the SGS instructing the SGS to generate a summary detailing the differences between the first program file and the second program file, and all the differences of the intervening program files, e.g., to create a change history. While the example scenario presented relates to a first program file and a second program file being compared, multiple program files can be compared in a single comparison process.

At 630, the summary component (or conflict component 245A-n) can be further configured to determine one or more differences between the content of the first program file and the second program file.

At 640, a summary of the differences can be compiled in a difference file (e.g., DIF file 117A-n).

At 650, the summary component can be further configured to generate a summary (e.g., summary 140A-n) of the differences in the DIFF file, in conjunction with one or more changes present in the DIFF file (e.g., changes 145A-n), wherein the summary component can be further configured to present (e.g., via HMI 186/screens 187) the summary for review (e.g., by entity 109A).

At 660, the summary component can be configured to determine whether the summary was acceptable (e.g., for use as a commit message, a change history log, and suchlike). Confirmation of acceptability of the summary can be a function of receiving a submit summary (e.g., a confirmation 275A received from confirmation component 270) or determining that an edit (e.g., edit 106A-n) is being applied to the summary (e.g., via editor component 260). In response to a determination that YES, the summary is acceptable, process 600 can advance to step 670, wherein the summary can be saved (e.g., in memory 184) with the second program file, e.g., as part of historical data (e.g., historical data 190).

At 660, in response to a determination that NO, the summary is not currently acceptable (e.g., an edit 106A-n is being applied, feedback 286A-n generated), process 600 can advance to step 680.

At 680, the editor component (e.g., editor component 260) can be configured to capture/record any edits (e.g., edits 106A-n) made to the summary by the entity. In an embodiment, while the content of a summary may be accurate with regard to the differences, the way in which the content was presented may not be in a form that the entity prefers and the subsequent edits may simply reflect the entity placing the content in a lay out/wording preferred by the entity.

At 690, the updated summary (e.g., a second summary 140B) can be re-presented to the entity, with process 600 returning to step 660 for further review of the summary and whether it is now acceptable. In an embodiment, while the summary may correctly present the changes implemented between the first program file and the second program file, upon reviewing the summary, the entity can determine that a further edit to the program code is required from which a third program file is generated and, accordingly, a second summary is generated based on differences between the first program file and the edits applied to the program code in response to content of the first summary.

Figure 7:
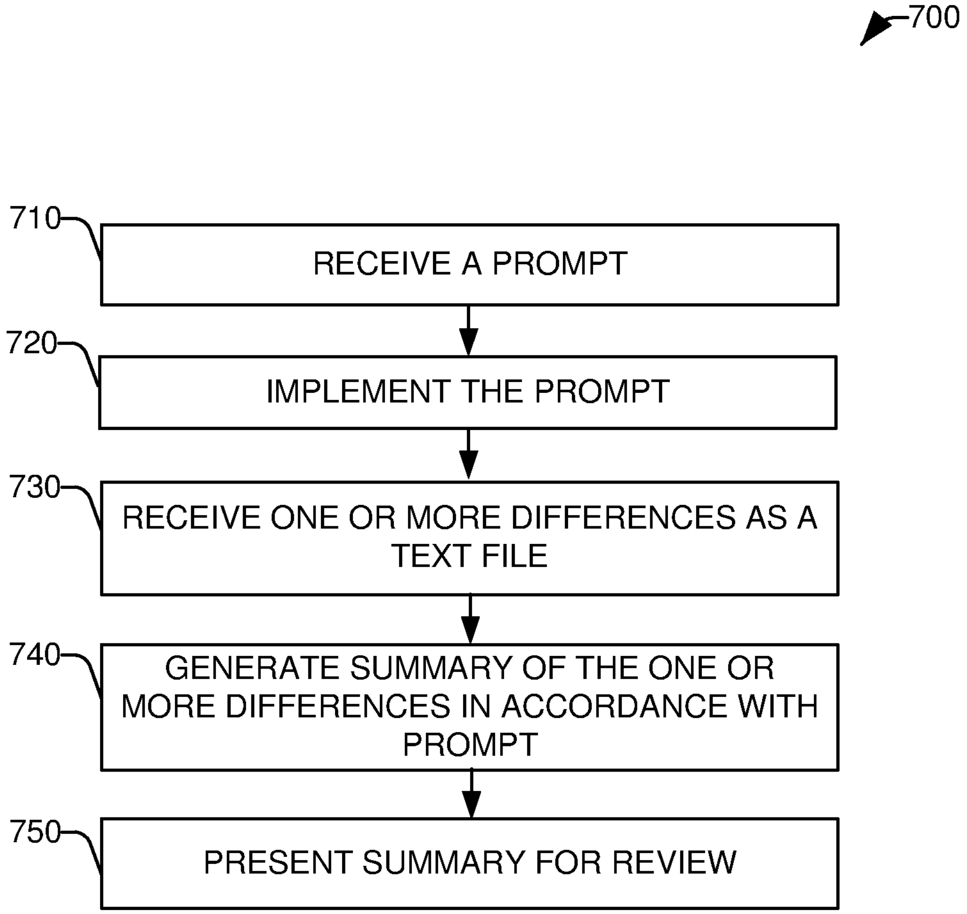
FIG. 7 presents a computer-implemented process for implementing a prompt to generate a summary of changes, in accordance with an embodiment.

FIG. 7 presents a computer-implemented process 700 for implementing a prompt to generate a summary of changes, in accordance with an embodiment. (commit message)

At 710, a summary generation system (e.g., SGS 110) can be configured to receive a prompt (e.g., prompt 215A-n), wherein the prompt can identify how a respective summary (e.g., summary 140A-n) is to be generated (e.g., by summary component 115). The prompt can be applied to the SGS by an entity (e.g., entity 109A) who is interacting with the summary. As previously mentioned, a prompt can include requirements regarding formatting/content of the summary, such as role (e.g., role 226A-n) of the entity, git format, provide in a markdown box, etc.

At 720, the prompt can be implemented at the SGS, e.g., by the prompt component (e.g., prompt component 212).

At 730, a difference file (e.g., DIFF file 117A-n) can be generated, whereby the DIFF file indicates one or more changes/differences between the first version (e.g., program code 105A) of a program code and the second version (e.g., program code 105B) of the program code.

At 740, a summary (e.g., summary 140A-n by summary component 115) can be generated, whereby the summary comprises the one or more differences. As previously mentioned, the summary can be generated with a plain language/natural language format while the first version of program code and second version of program code comprise a formal language format. The content of the summary can be configured in accordance with the one or more requirements in the prompt.

At 750, the summary can be presented for review by the entity, wherein the summary can be accepted or further edited, as previously described.

Figure 8:
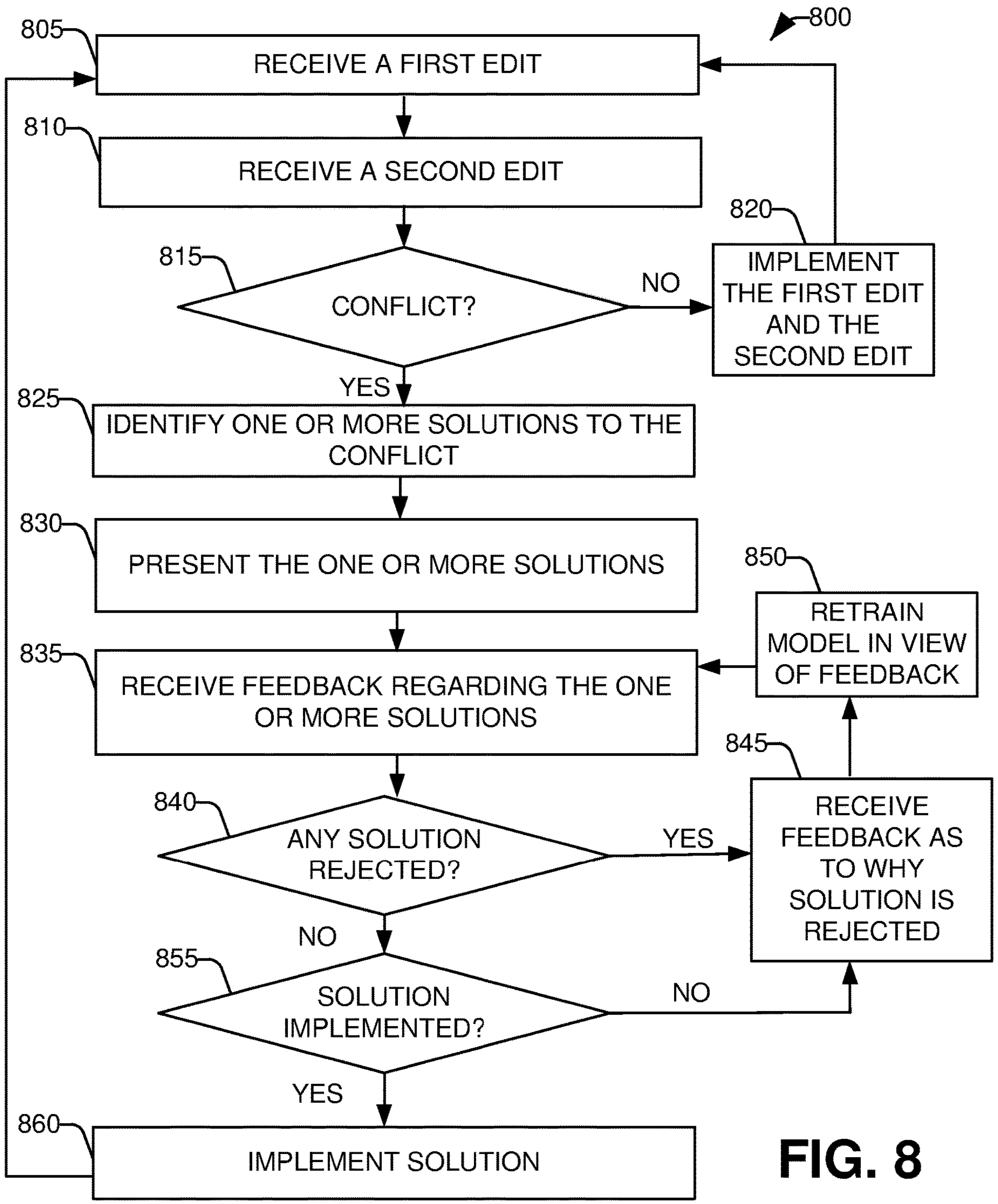
FIG. 8 presents a computer-implemented process for resolving a merge conflict, in accordance with an embodiment.

FIG. 8 presents a computer-implemented process 800 for resolving a merge conflict, in accordance with an embodiment.

At 805, a first program edit (e.g., edit 106A by entity 109A) can be detected by a conflict component (e.g., by conflict component 245), wherein the first program edit is being applied to an initial instance of program code (e.g., program code 105A).

At 810, a second program edit (e.g., edit 106B by entity 109B) can be further detected by the conflict component, wherein the second program edit is also being applied to the initial instance of program code.

At 815, the conflict component can be configured to compare content of the first program edit with the second program edit, and further configured to determine whether a conflict exists between implementing the first program edit and implementing the second program edit. E.g., the first program edit and the second program edit are both directed towards adjusting operation of a PLC (e.g., PLC 104A). In response to a determination that NO, a conflict does not arise from implementing the first program edit and the second program edit, process 800 can advance to 820, whereupon the first program edit and the second program edit can be applied to the program code. Process 800 can further return to step 805 to receive subsequent program edits and determine whether a conflict arises by implementing the subsequent program edits.

At 815, in response to a determination by the conflict component of YES, a potential conflict could arise by implementing both the first program file and the second program file, process 800 can advance to step 825, whereupon one or more solutions (e.g., options 246A-n) can be determined by the conflict component to potentially resolve the identified conflict.

At 830, the one or more solutions can be presented to the one or more entities generating the first program edit and the second program edit. In an embodiment, in the event of multiple solutions being presented, the solutions can be ranked according to the likelihood of success of a particular solution in resolving the conflict, and suchlike.

At 835, feedback (e.g., feedback 286A-n) can be received (e.g., by conflict component 245) regarding the one or more proposed solutions, whereby feedback can be received from either of the entities.

At 840, the feedback can be reviewed (e.g., by conflict component 245) to determine whether any of the solutions were rejected, and if so, why. In response to a determination by the conflict component that YES, a solution was rejected, process 800 can advance to step 845 whereupon any feedback received regarding why a particular solution was rejected can be reviewed. Process 800 can further advance to step 850, whereupon the feedback can be utilized by a training component (e.g., training component 290) to retrain the AI/ML processes (e.g., processes 126A-n).

At 840, in response to a determination that NO, a solution was not outright rejected as being un-implementable, non-pertinent, etc., process 800 can advance to step 855. At 855, the conflict component can be further configured to determine that, while none of the solutions were not directly rejected with accompanying feedback as to a reason for the rejection, a determination can be made regarding whether any of the one or more solutions was selected/implemented. In response to a determination that NO, none of the one or more solutions were implemented, process 800 can return to step 845, whereupon further feedback can be requested regarding why a proposed solution(s) was not implemented.

At 855, in response to a determination that YES, a solution was selected for implementation, process 800 can advance to step 860, whereupon the selected solution can be implemented.

Figure 9:
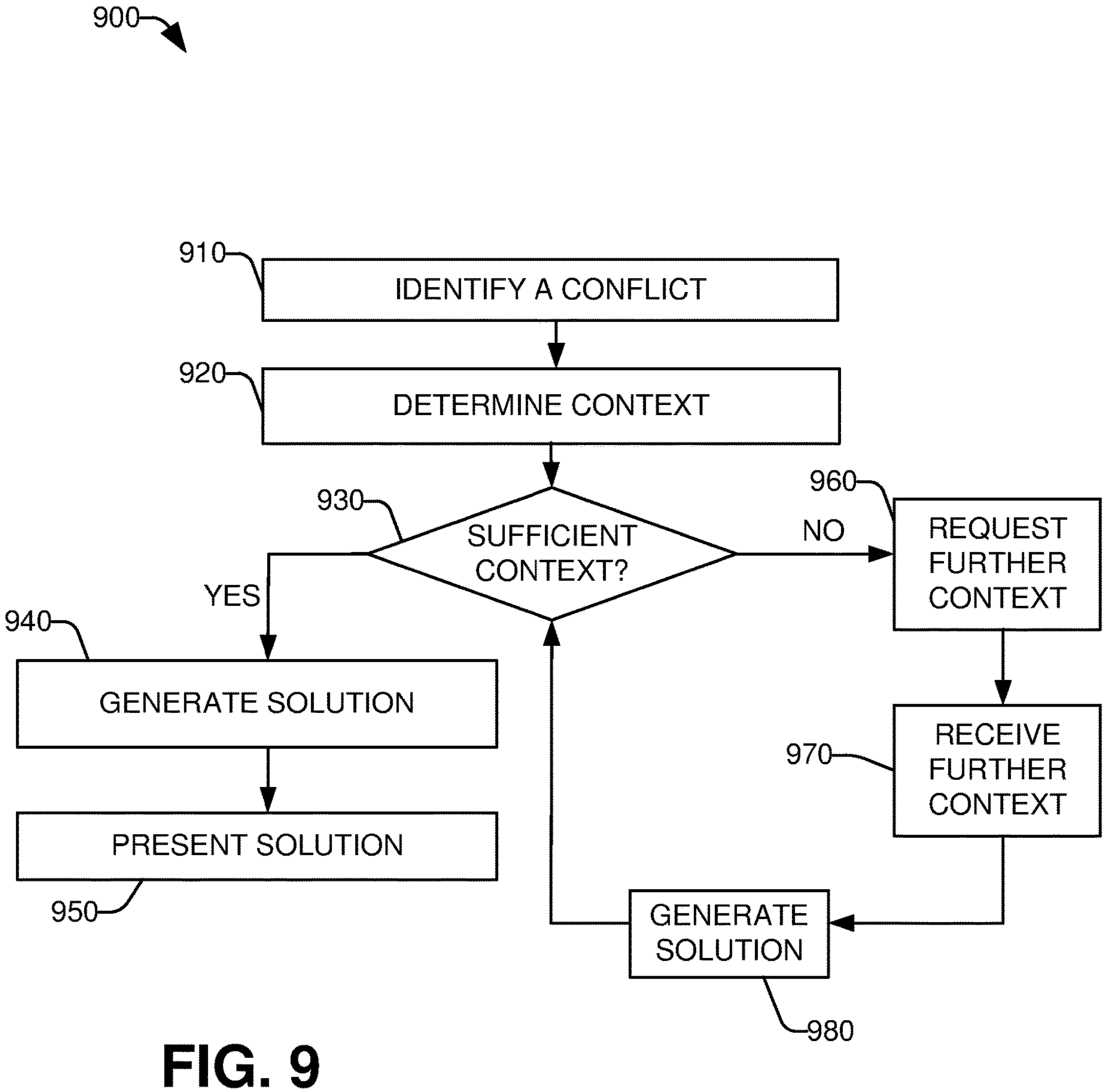
FIG. 9 presents a computer-implemented process for generating a solution to a merge conflict, in accordance with an embodiment.

FIG. 9 presents a computer-implemented process 900 for generating a solution to a merge conflict, in accordance with an embodiment.

At 910, a merge conflict (e.g., conflict 117A-n) can be identified (e.g., by conflict component 245) as a function of one or more edits (edits 106A-n) being applied to a program code (e.g., program codes 105A-n), e.g., per FIGS. 5A and 5B. In an example scenario, a merge conflict can arise when an entity (e.g., entity 109A) is attempting to edit an existing version of program code and a conflict arises as a current device/parameter/setting cannot be altered. In another example scenario, a merge conflict can arise when a first entity (e.g., entity 109A) is attempting to apply a first edit (e.g., edit 106A) to a program code (e.g., program code 105A) but a second entity (e.g., entity 109B) is attempting to concurrently apply a second edit (e.g., edit 106B) to the program code, and the first edit and second edit clash.

At 920, a context component (e.g., context component 240) can be configured to determine the context (e.g., context 241A-n) of the conflict. As previously mentioned, a merge conflict can arise when two or more entities (e.g., entities 109A and 109B) are applying one or more edits to a program code, where the one or more edits are directed to the same device, mention the same device but are actually directed towards implementing two distinct devices, and suchlike. In an embodiment, the context component can utilize historical data (e.g., historical data 190) to provide context to a current edit based on prior edits (e.g., edits 106A-n), supplemental files (e.g., supplemental files 107A-n), prior iterations of any program code (e.g., prior codes 105A-n) pertaining to the current edits, and suchlike.

At 930, in an embodiment, a further determination by the context component can be made regarding whether sufficient context is available to exists for the conflict component to generate a proposed solution (e.g., option 246A-n) to the conflict. In response to a determination that YES, sufficient context exists, process 900 can advance to 940, whereupon the proposed solution can be generated.

At 950, the proposed solution can be presented for review (per FIG. 8, step 825).

At 930, in response to a determination by the context component that NO, sufficient content does not exist, process 900 can advance to step 960 whereupon the context component can be further configured to generate a request for further input regarding context of the first edit, a second edit, an intent of the edit(s), operation of the equipment, etc.

At 970, further context can be received by the context component.

At 980, a further solution to the conflict can be subsequently generated by the context component, wherein the further solution can be generated based on the further received context. Process 900 can return to step 930 for a subsequent determination regarding whether the further provided context enables a proposed solution to be generated.

Figure 10:
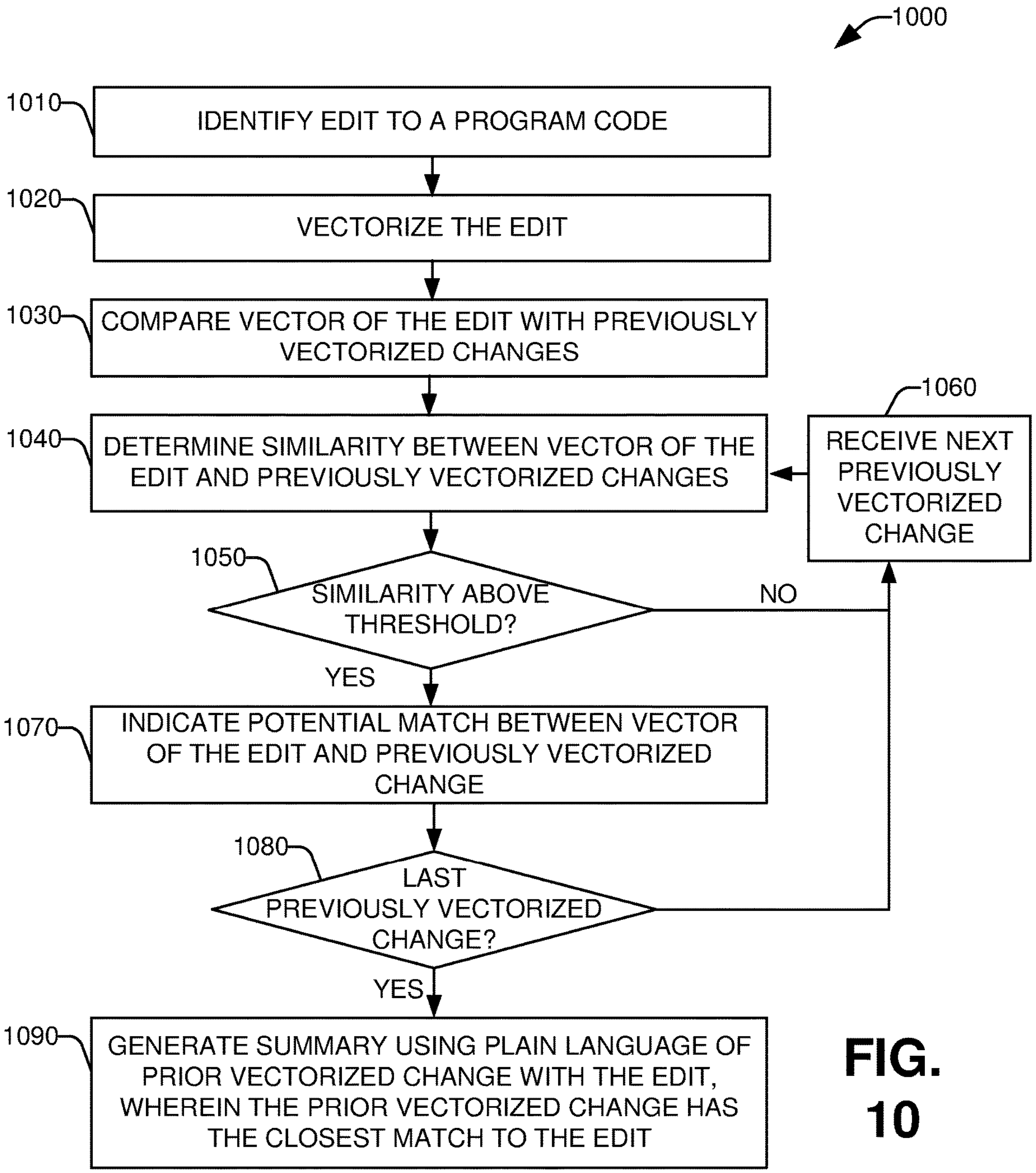
FIG. 10 presents a computer-implemented process for matching features in an edit to a program file(s) with historical data, in accordance with an embodiment.

FIG. 10 presents a computer-implemented process 1000 for matching features in an edit to a program file(s) with historical data, in accordance with an embodiment.

At 1010, an edit (e.g., edit 106A-n) can be received at an SGS (e.g., SGS 110), wherein the edit is to be applied to a program file (e.g., program code 105A-n).

At 1020, the edit can be vectorized (e.g., by a vector process 126A-n implemented by summary component 115), such that, for example, an edit comprises alphanumerics, parameter settings, etc., which can be identified and vectored.

At 1030, as previously mentioned, historical data (e.g., historical data 190), prior edits (e.g., prior edits 106B-n), feedback 286A-n, etc., can be compiled (e.g., in memory 184) and also vectorized by the vector process. The previously vectorized changes can have associated therewith one or more summaries (e.g., summaries 140A-n) having a plain language content which can be utilized to generate further summaries.

At 1040, a similarity process (e.g., a similarity process 126A-n implemented by the summary component 115) can be utilized to determine a similarity $S_{1-n}$ between the vector of the edit and one or more previously vectorized changes. A similarity threshold can also be implemented by the summary component, such that if $S1>S_{HIGH}$, then there is a high degree of confidence that a vector of the edit and a previously vectorized change are the same/similar, while if $S1<S_{HIGH}$, then the degree of confidence that a vector of the edit and a previously vectorized change are the same is reduced.

At 1050, in response to a determination by the summary component that $S1<S_{HIGH}$, there is NO similarity (or the similarity is below a given threshold), process 1000 can advance to 1060, whereupon the next previously vectorized change (e.g., in the historical data) is obtained, process 1000 returns to 1040 for the next similarity to be determined. Information regarding the similarity determination process for the respective previously vectorized annotation and the vectorized image annotation can be stored (e.g., as historical data 190), e.g., for future implementation of a similarity process.

At 1050, in response to a determination by the similarity component that $S1>S_{HIGH}$, YES there is similarity, process 1000 can advance to 1070, whereupon the potential match between the vectorized edit and the previously vectorized content in the historical data can be indicated for the proposed edit.

At 1080, a determination by the summary component can be made regarding whether the last previously vectorized content in the historical data has been compared to the vectorized edit. In response to a determination of NO, similarity analysis has not been performed on the last previously vectorized content, process 1000 can return to step 1160, for the next previously vectorized content to be reviewed against the vectorized edit.

At 1080, in response to a determination of YES, similarity analysis has been performed on the last previously vectorized content, methodology 1000 can advance to step 1090. A summary (e.g., summary 140A-n) can be generated by the summary component, wherein the summary identifies the edits/changes applied to the program code, with the content of the summary utilizing the plain language of the previously vectorized content having sufficient similarity to the edit(s) of concern.

The respective steps in process 1000 can be similarly applied to generating one or more options 246A-n to resolve a merge conflict 117A-n, where the options can be presented with the plain language format 112A-n.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Per the various embodiments presented herein, various components included in the SGS 110, summary component 115, format component 220, prompt component 212, entity component 225, version control component 230, context component 240, conflict component 245, editor component 260, notification component 285, training component 290, and suchlike, can include/utilize AI and ML and reasoning techniques and technologies (e.g., processes 126A-n) that employ probabilistic and/or statistical-based analysis to prognose or infer an action that a user desires to be automatically performed. The various embodiments presented herein can utilize various machine learning-based schemes for carrying out various aspects thereof. For example, a process for determining summaries 140A-n, changes 145A-n, options 246A-n, and suchlike and plain language format 112A-n utilized to create their respective content, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., identifying respective changes applied to the program codes 104A-n and creation of one or more summaries 140A-n and/or resolving merge conflicts 117A-n and generation of options 246A-n.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, generation of a summary 140A-n in accordance with a user-preferred criteria (e.g., per instruction 150A-n, prompt 215A-n, feedback 286A, and suchlike), whereby the summary 140A-n comprises plain language format 112A-n, and similarly generating options 246A-n to a merge conflict 117A-n where the option 246A-n is presented with plain language format 112A-n, for example.

As described supra, inferences can be made, and automated operations performed, based on numerous pieces of information. For example, whether sufficient context 241A-n is available to infer, with a high degree of confidence, correlation of content of a summary 140A-n, the edits 106A-n made, and the plain language format 112A-n content implemented, and further the suitability of an option 246A-n to address a merge conflict 117A-n, and suchlike, to enable versioning and editing of program codes 105A-n.

Example Applications and Use

Figure 11:
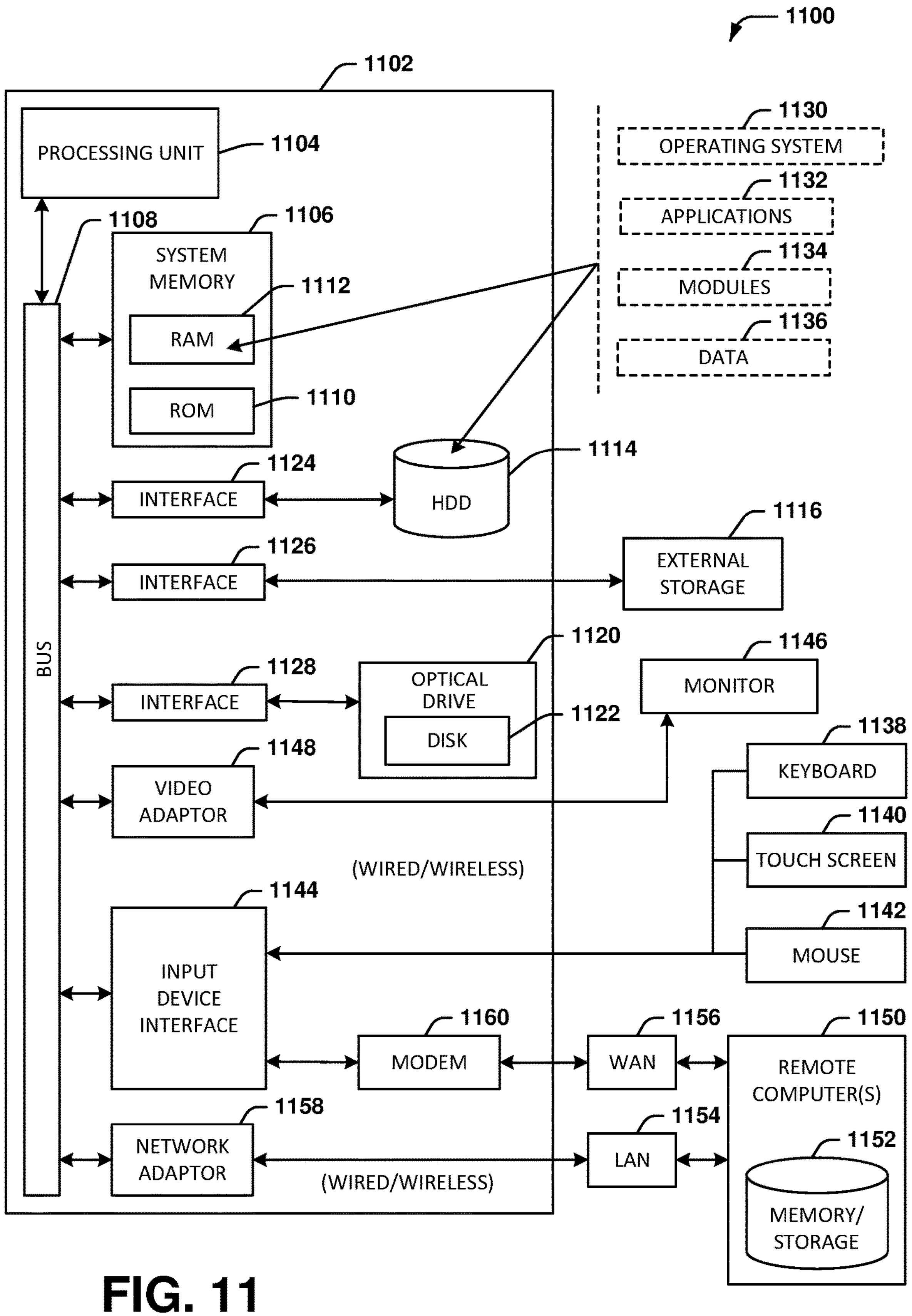
FIG. 11 is a block diagram illustrating an example computing environment in which the various embodiments described herein can be implemented.
Figure 12:
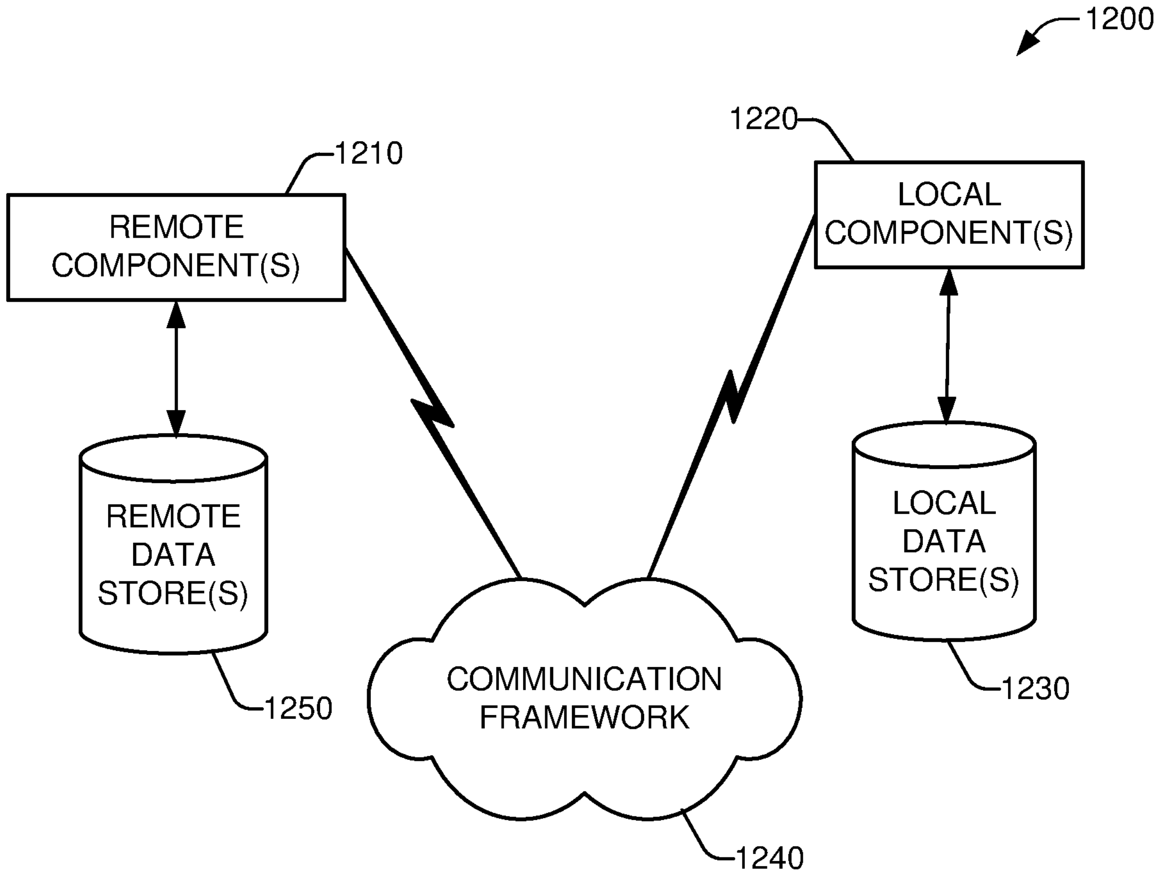
FIG. 12 is a block diagram illustrating an example computing environment with which the disclosed subject matter can interact, in accordance with an embodiment.

Turning next to FIGS. 11 and 12, a detailed description is provided of additional context for the one or more embodiments described herein with FIGS. 1-10.

In order to provide additional context for various embodiments described herein, FIG. 11 and the following discussion are intended to provide a brief, general description of a suitable computing environment 1100 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1122 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 12, an illustrative cloud computing environment 1200 is depicted. FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
- a memory that stores computer executable components; and
- a processor that executes the computer executable components stored in the memory, wherein the computer executable components comprise:
  - a summary component configured to:
    - receive a first version of program code; and
    - determine an edit being made to the first version of program code, wherein the edit creates a second version of the program code that is different from the first version of the program code and that, in response to execution on an industrial controller, configures the industrial controller to control operation of devices of an industrial automation system; and
  - a prompt component configured to receive a prompt describing context regarding how a summary of a difference between the first version of the program code and the second version of the program code is to be generated,
  - wherein the summary component is further configured to:
    - generate the summary in accordance with the context as determined based on analysis of the prompt;
    - render, on a client device, the summary in a plain language format, wherein content of the summary describes an effect of applying the edit to the first version of the program code,
    - receive an input regarding the content of the summary; and
    - in response to determining that the input confirms correctness of the summary, save the summary as a commit message in conjunction with a version of the program code.

2. The system of claim 1, wherein the first version of the program code and the second version of the program code have a formal language format.

3. The system of claim 2, wherein the executable components further comprise:
- a format component configured to convert the program code from the formal language format to the plain language format; and
- a presentation component configured to render the program code in the plain language and the summary in the plain language format.

4. The system of claim 1, wherein
- the edit is a first edit, and
- the executable components further comprise an editor component configured to:
  - capture a second edit made to the summary;
  - update the summary with the second edit to yield an edited summary; and
  - save the edited summary with the second version of program code.

5. The system of claim 1, wherein
- the second version of the program code is created from the first version of the program code, and
- the first version of the program code and the second version of the program code are sequentially adjacent in a version control history.

6. The system of claim 1, wherein the summary component is further configured to generate the summary in accordance with domain specific language being utilized for the industrial automation system.

7. The system of claim 1, wherein
- the executable components further comprise an entity component configured to generate entity context regarding at least one of a role of an entity generating the second version of the program code or a preferred language of the entity, and
- the summary component is further configured to generate the summary in accordance with the entity context.

8. The system of claim 1, wherein the prompt describes, as the context, at least one of a level of detail for the summary, content to be included in the summary, or a user role for which the summary is to be generated.

9. The system of claim 1, wherein the summary component is configured to generate the summary based on analysis of a diff file representing differences between the first version of the program code and the second version of the program code.

10. A computer-implemented method performed by a device operatively coupled to a processor, wherein the method comprising:
- receiving, by the device, a first version of program code;
- determining, by the device, an edit being made to the first version of the program code, wherein the edit creates a second version of the program code that is different from the first version of the program code and that, in response to execution on an industrial controller, configures the industrial controller to control operation of devices of an industrial automation system;

receiving, by the device, a prompt describing context regarding how a summary of a difference between the first version of the program code and the second version of the program code is to be generated;

generating, by the device, the summary in accordance with the context as determined based on analysis of the prompt;

displaying, by the device, the summary in a plain language format, wherein content of the summary describes an effect of applying the edit to the first version of the program code; and in response to receiving input indicating correctness of the summary, saving, by the device, the summary as a commit message in conjunction with a version of the program code.

11. The computer-implemented method of claim 10, wherein the first version of the program code and the second version of the program code have a formal language format.

12. The computer-implemented method of claim 10, further comprising:

receiving, by the device, an edit made to the summary;

updating, by the device, the summary in accordance with the edit to yield an edited summary; and saving, by the device, the edited summary with the second version of the program code.

13. The computer-implemented method of claim 10, further comprising:

generating, by the device, entity context regarding at least one of a role of an entity generating the second version of the program code or a preferred language of the entity; and generating, by the device, the summary in accordance with the entity context.

14. The computer-implemented method of claim 10, wherein the prompt describes, as the context, at least one of a level of detail for the summary, content to be included in the summary, or a user role for which the summary is to be generated.

15. The computer-implemented method of claim 10, wherein the generating of the summary comprises generating the summary based on analysis of a diff file representing differences between the first version of the program code and the second version of the program code.

16. A computer program product stored on a non-transitory computer-readable medium and comprising machine-executable instructions, wherein, in response to being executed, the machine-executable instructions cause computing equipment to perform operations, comprising:

receiving a first version of program code;

determining an edit being made to the first version of the program code, wherein the edit creates a second version of the program code that is different from the first version of the program code and that, in response to execution on an industrial controller, configures the industrial controller to control operation of devices of an industrial automation system;

receiving a prompt describing context regarding how a summary of a difference between the first version of the program code and the second version of the program code is to be generated;

generating the summary in accordance with the context as determined based on analysis of the prompt;

rendering the summary on a client device in a plain language format, wherein the summary describes an effect of applying the edit to the first version of the program code; and in response to receiving input indicating correctness of the summary, saving the summary as a commit message in conjunction with a version of the program code.

17. The computer program product according to claim 16, wherein the first version of the program code and the second version of the program code have a formal language format.

18. The computer program product according to claim 16, wherein the operations further comprise:

generating entity context regarding at least one of a role of an entity generating the second version of the program code or a preferred language of the entity; and generating the summary in accordance with the entity context.

19. The computer program product according to claim 16, wherein the prompt describes, as the context, at least one of a level of detail for the summary, content to be included in the summary, or a user role for which the summary is to be generated.

20. The computer program product according to claim 16, wherein the generating of the summary comprises generating the summary based on analysis of a diff file representing differences between the first version of the program code and the second version of the program code.

* * * * *